United States Patent
Yamamoto et al.

(10) Patent No.: US 9,375,813 B2
(45) Date of Patent: Jun. 28, 2016

(54) NOZZLE REPAIRING METHOD AND NUCLEAR REACTOR VESSEL

(71) Applicant: MITSUBISHI HEAVY INDUSTRIES, LTD., Tokyo (JP)

(72) Inventors: Takeshi Yamamoto, Tokyo (JP); Tomochika Hamamoto, Tokyo (JP); Nobuyuki Hori, Tokyo (JP); Tsuyoshi Nishimura, Tokyo (JP); Hideshi Sakashita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 753 days.

(21) Appl. No.: 13/853,610

(22) Filed: Mar. 29, 2013

(65) Prior Publication Data
US 2014/0064431 A1    Mar. 6, 2014

(30) Foreign Application Priority Data

Aug. 30, 2012 (JP) ................................. 2012-190393

(51) Int. Cl.

| G21C 9/00 | (2006.01) |
|---|---|
| B23P 6/04 | (2006.01) |
| G21C 13/02 | (2006.01) |
| G21C 13/036 | (2006.01) |
| G21C 17/017 | (2006.01) |
| G21C 19/20 | (2006.01) |
| G21C 5/00 | (2006.01) |

(52) U.S. Cl.
CPC ... B23P 6/04 (2013.01); G21C 5/00 (2013.01); G21C 13/02 (2013.01); G21C 13/036 (2013.01); G21C 17/017 (2013.01); G21C 19/207 (2013.01); Y02E 30/40 (2013.01); Y10T 29/49734 (2015.01); Y10T 29/49737 (2015.01)

(58) Field of Classification Search
CPC .... G21C 13/032; G21C 13/036; G21C 19/00; G21C 19/20; G21C 19/207
See application file for complete search history.

(56) References Cited

U.S. PATENT DOCUMENTS

2012/0175352 A1* 7/2012 Kamo ...................... F16L 5/022
219/121.6

FOREIGN PATENT DOCUMENTS

| JP | 02-102493 A | 4/1990 | |
|---|---|---|---|
| JP | 2007-232457 A | 9/2007 | |
| JP | 2011-075453 A | 4/2011 | |
| JP | 2011075453 A * | 4/2011 | ............. F16L 5/022 |
| JP | 2011-145271 A | 7/2011 | |
| JP | 2012-032291 A | 2/2012 | |

* cited by examiner

*Primary Examiner* — Marshall O'Connor
(74) *Attorney, Agent, or Firm* — Westerman, Hattori, Daniels & Adrian, LLP

(57) ABSTRACT

It is possible to improve the workability and the stress corrosion resistance by easily performing a repairing operation in a nozzle repairing method and a nuclear reactor vessel. The repairing method includes: removing a first connection portion ((trepanned portion) 208) with respect to an in-core instrument tube (204) in a groove-welding portion (206); removing the in-core instrument tube (204) from a lower mirror (66); leaving and grooving a second connection portion ((existing welding portion) 211) with respect to the lower mirror (66) in the groove-welding portion (206); inserting a new in-core instrument tube (204A) into an attachment hole (203); and groove-welding (so as to form a new groove-welding portion (213)) the inner side of the lower mirror (66) so as to fix the new in-core instrument tube (204A).

6 Claims, 26 Drawing Sheets

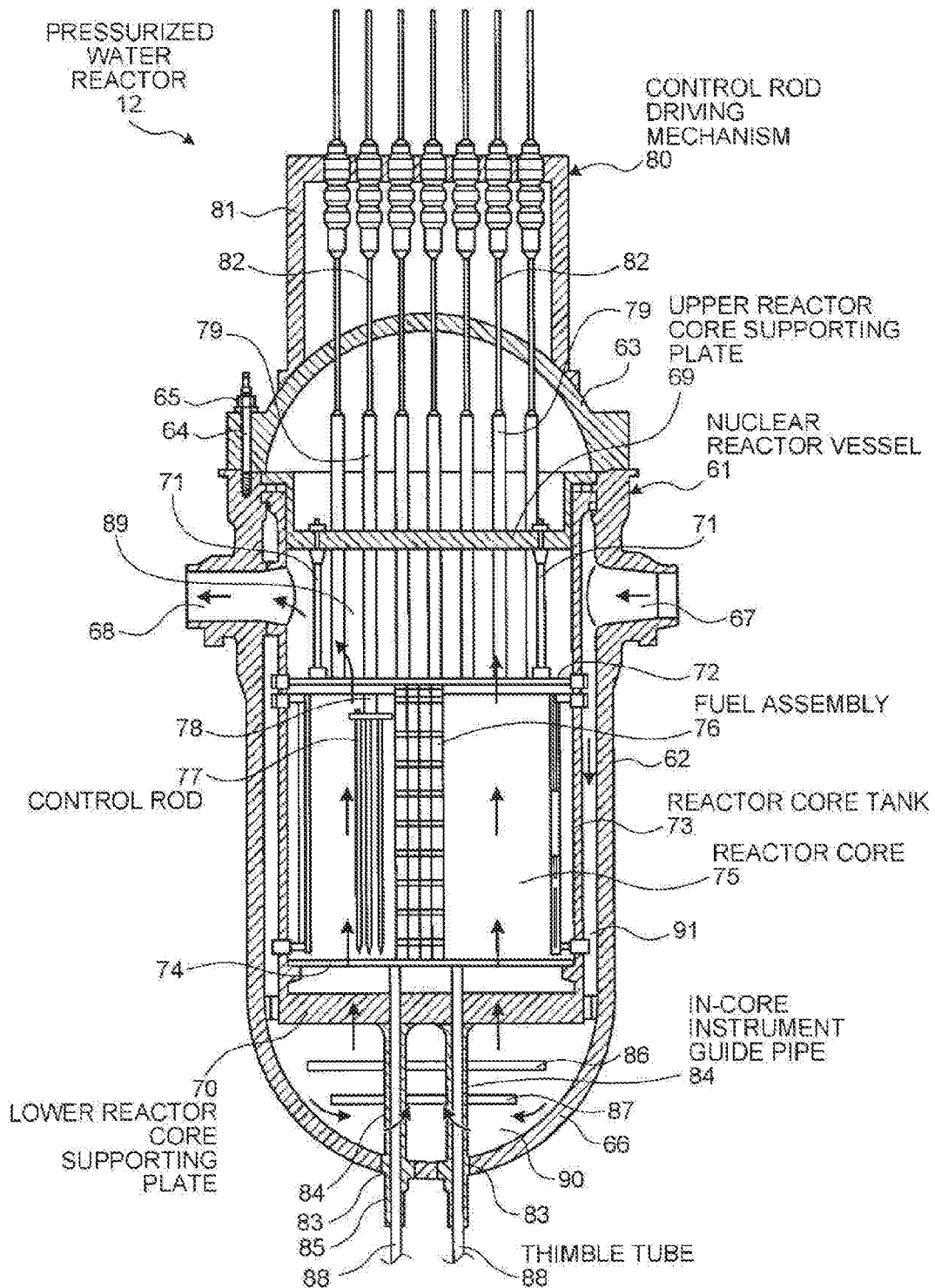

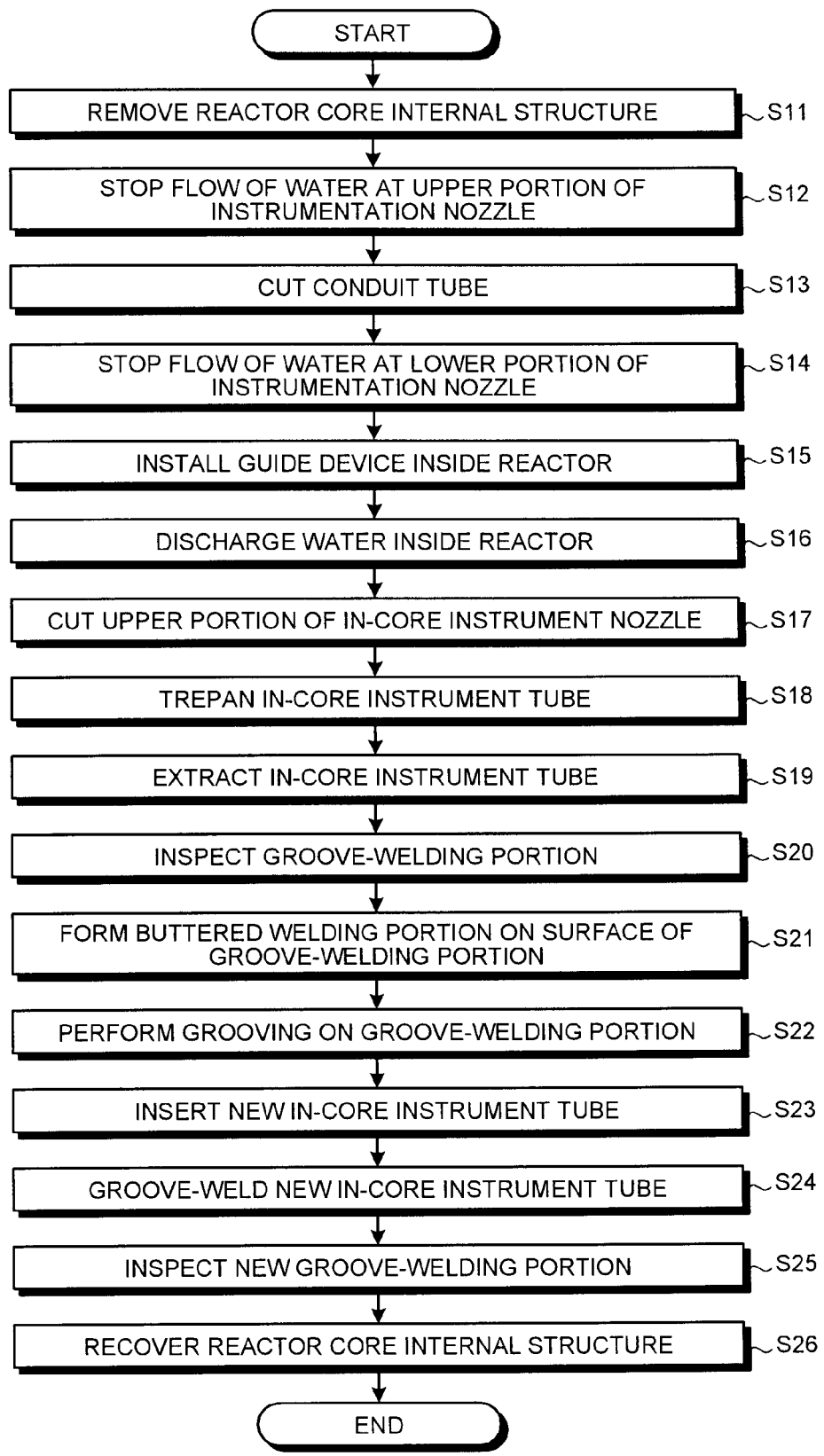

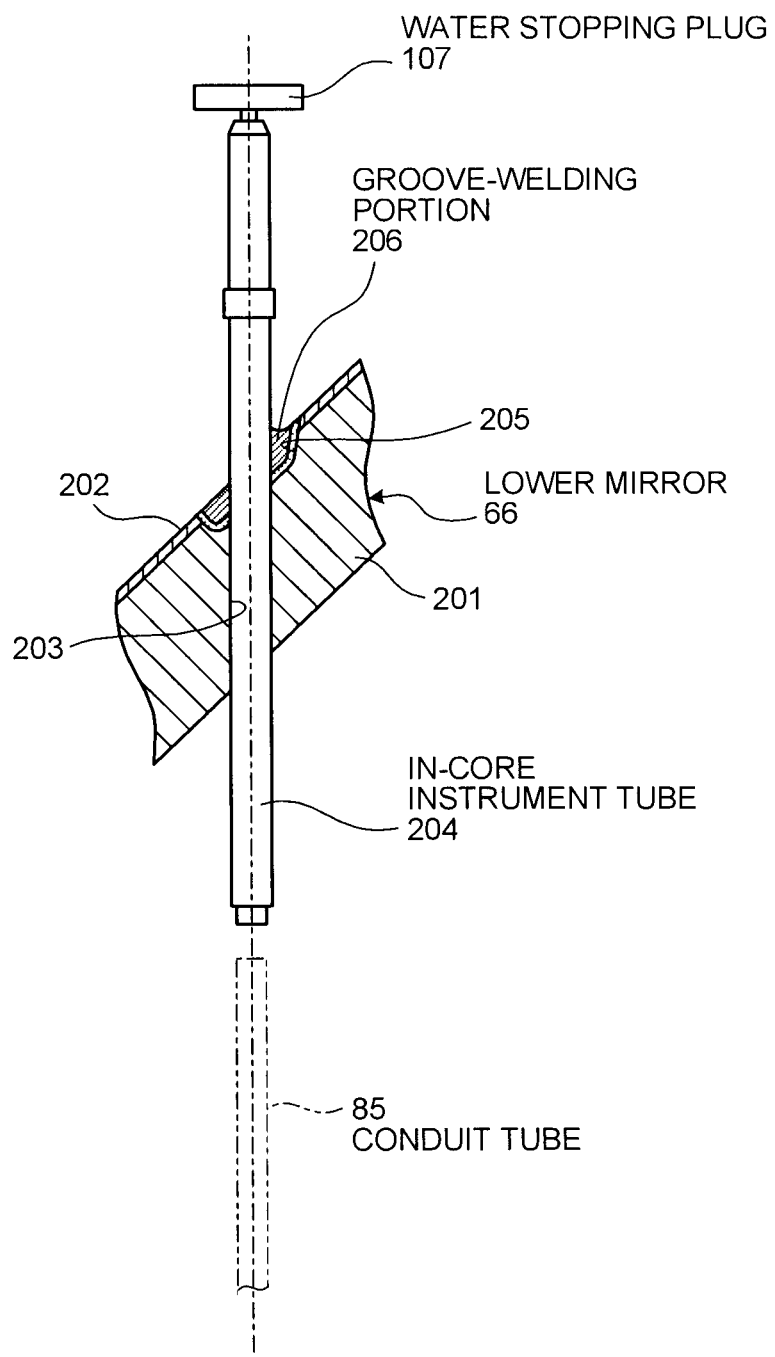

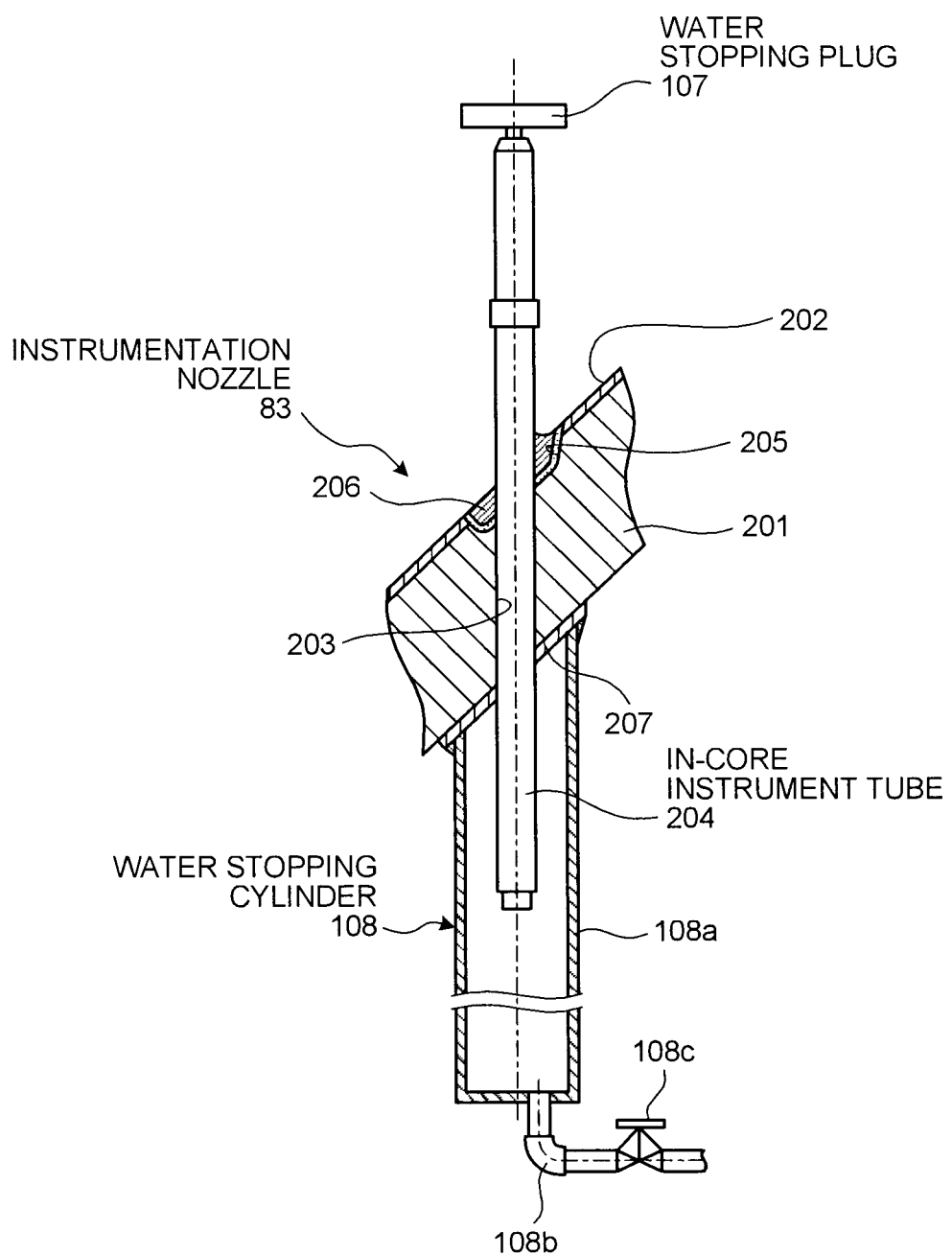

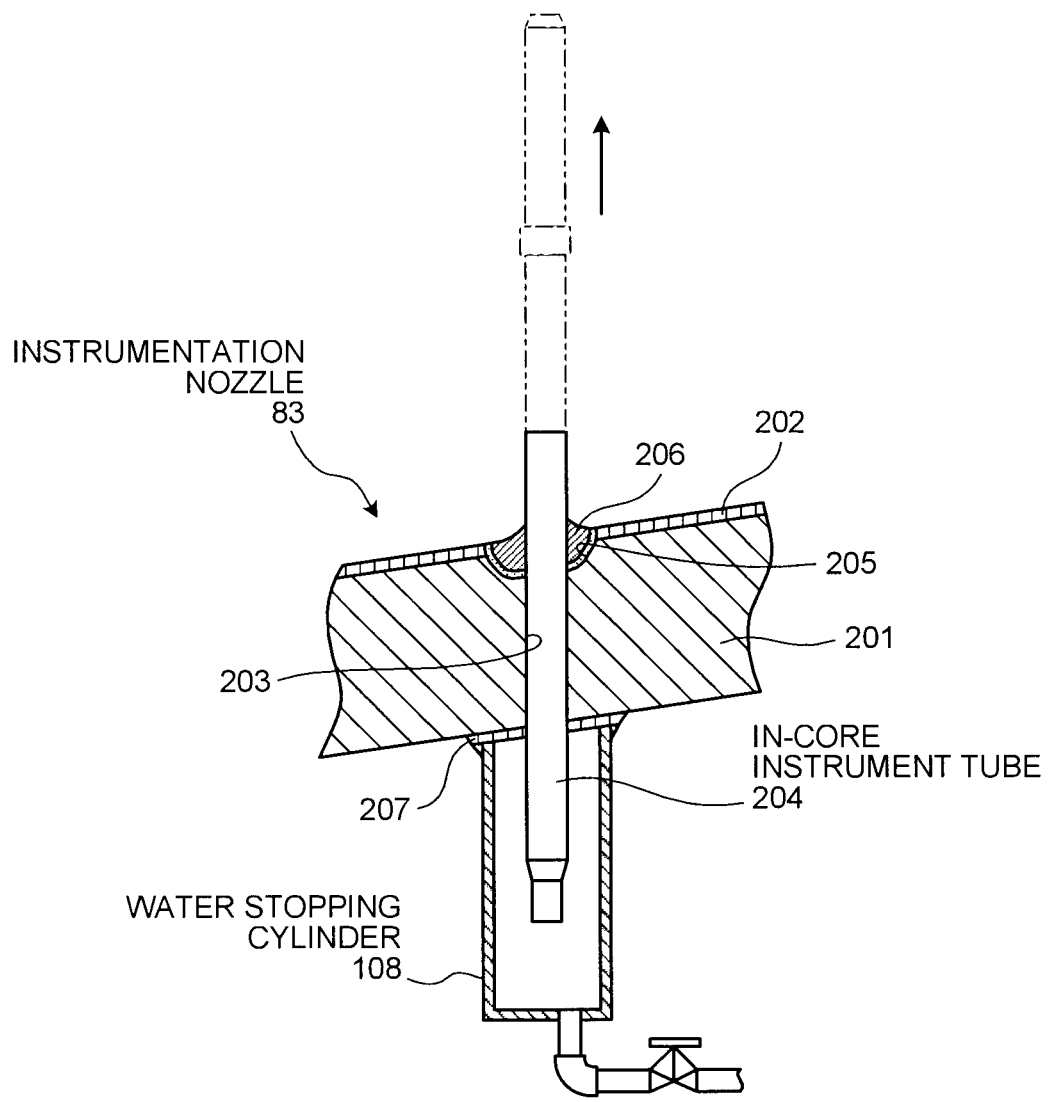

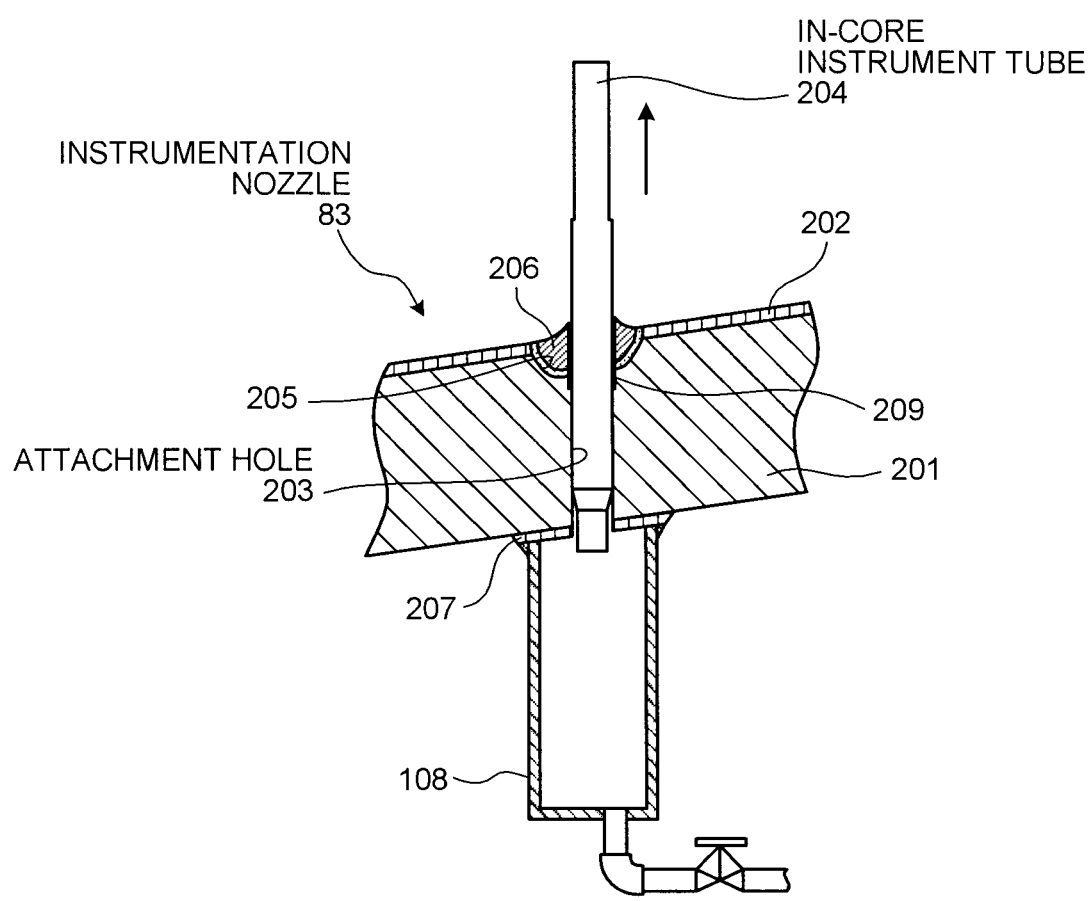

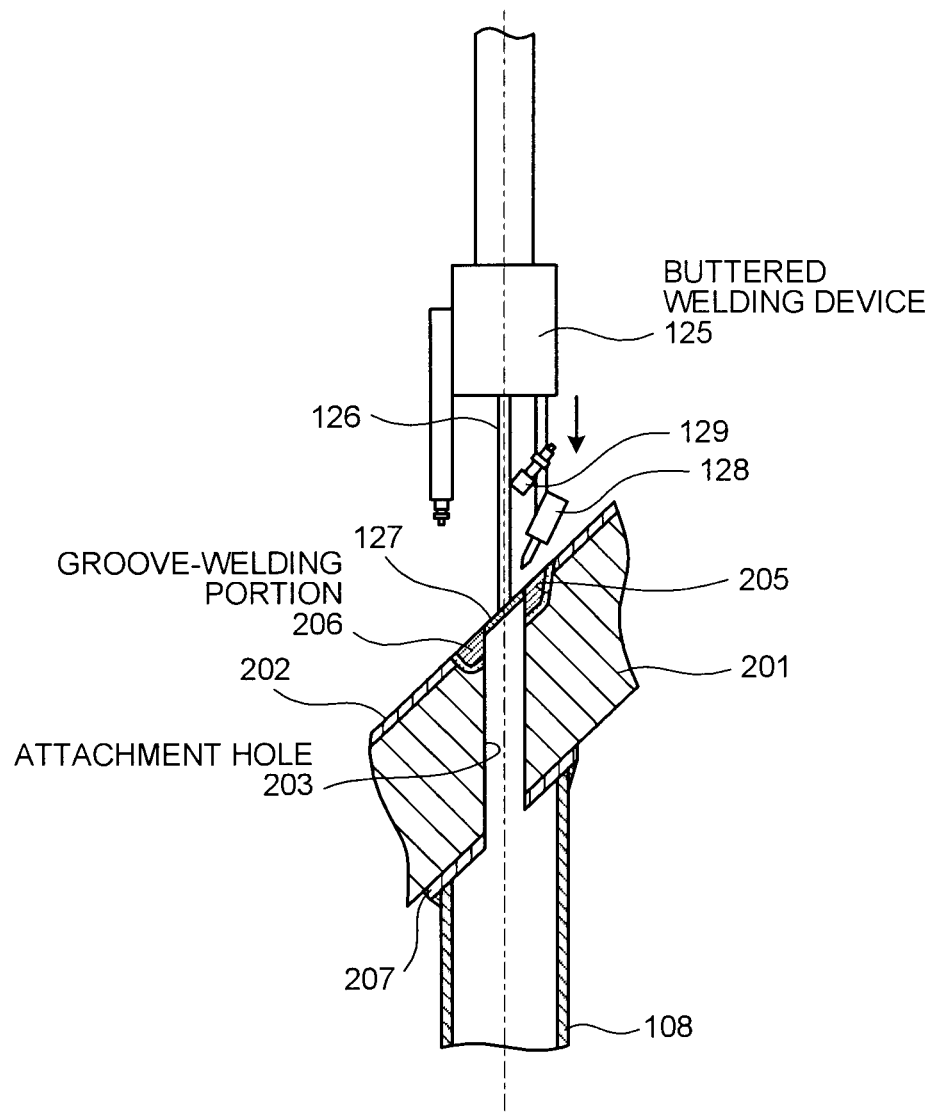

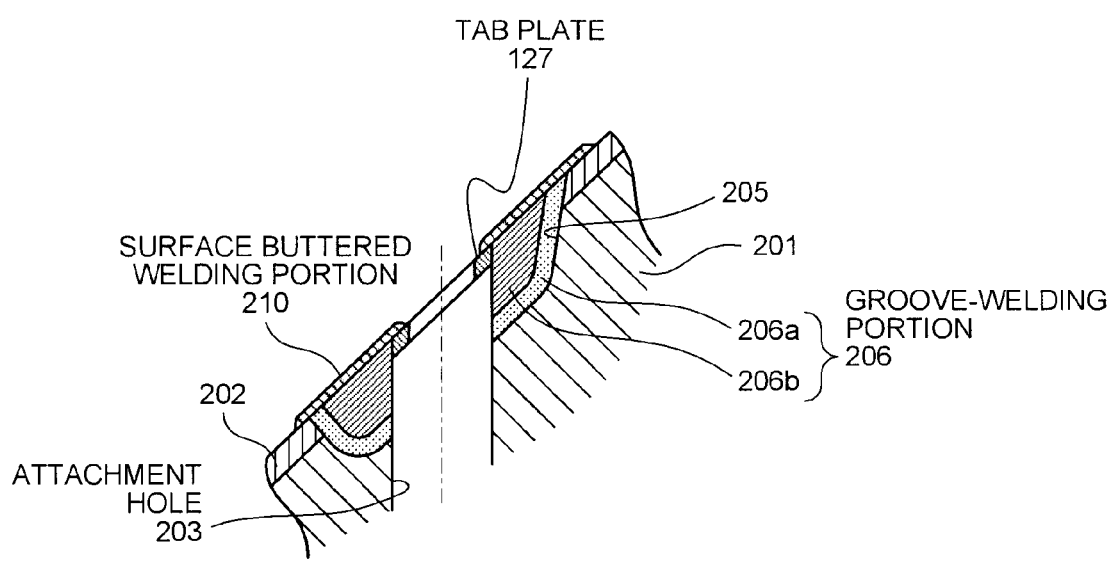

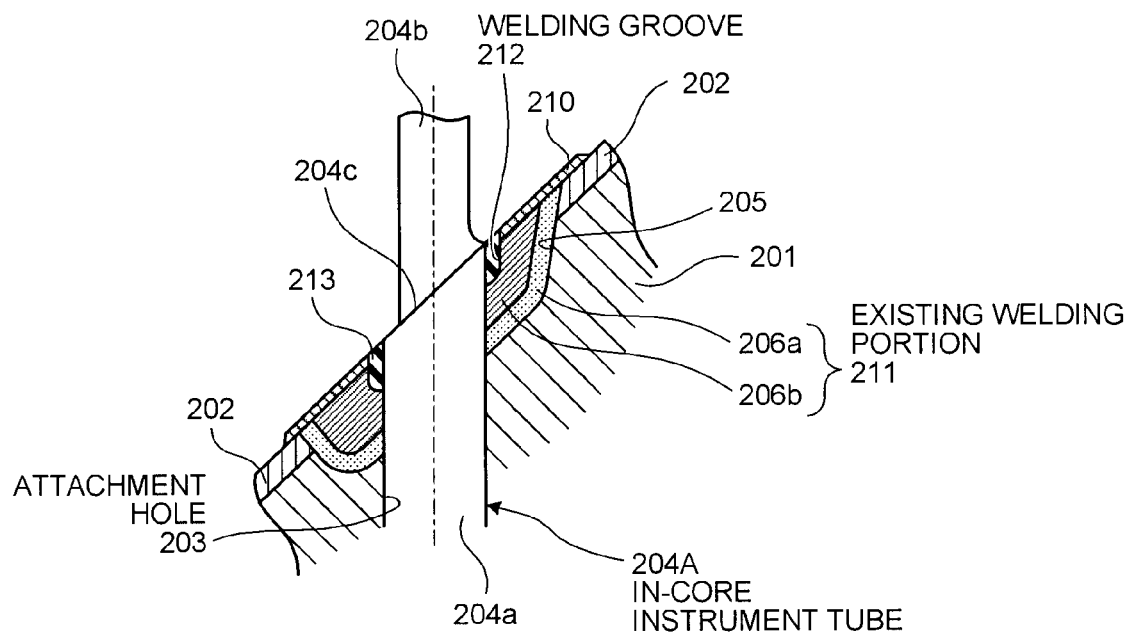

NOZZLE REPAIRING METHOD AND NUCLEAR REACTOR VESSEL

FIELD

The present invention relates to a nozzle repairing method of repairing a nozzle provided in a nuclear reactor vessel and a nuclear reactor vessel provided with a nozzle.

BACKGROUND

For example, a nuclear power plant with a pressurized water reactor (PWR) uses light water as nuclear reactor coolant and neutron moderator, keeps the light water as high-temperature and high-pressure water that is not boiled in the entire reactor core, sends the high-temperature and high-pressure water to a steam generator so as to generate steam by a heat exchange therebetween, and sends the steam to a turbine generator so as to generate electric power.

In such a nuclear power plant, there is a need to periodically inspect various structures in order to ensure enough safety or reliability in the pressurized water reactor. Then, when any problem is found by the respective inspections, the portion causing the problem is repaired. For example, the nuclear reactor vessel body of the pressurized water reactor is provided with a plurality of instrumentation nozzles penetrating a lower mirror. Here, in each instrumentation nozzle, an in-core instrument guide tube is fixed to the upper end inside the reactor and a conduit tube is connected to the lower end outside the reactor. Then, a neutron flux detector capable of measuring a neutron flux is insertable from the instrumentation nozzle by the conduit tube to the reactor core (fuel assembly) through the in-core instrument guide tube.

The instrumentation nozzle is formed in a manner such that the in-core instrument tube formed of nickel base alloy is fitted into the attachment hole of the nuclear reactor vessel body formed of low-alloy steel and is welded by a material formed of nickel base alloy. For this reason, there is a possibility that stress corrosion cracking may be generated in the in-core instrument tube due to the long-time usage, and there is a need to repair the instrumentation nozzle in the event of stress corrosion cracking. As the nozzle repairing method of the related art, for example, a method is disclosed in Patent Literature 1. In a long housing repairing method disclosed in Patent Literature 1, a long housing such as a neutron flux monitor housing fixed and supported to a lower mirror of a nuclear reactor vessel by welding is cut at upper and lower sides of a welding portion, the cut housing is removed, a groove-welding portion of a nozzle of the nuclear reactor vessel is removed along with the left housing, and a groove is restored at a nozzle head. Then, a housing inserted from a through-hole of the nuclear reactor pressure vessel is fixed and supported through a groove-welding portion of a nozzle and an insertion front end is fixed to the housing by welding.

CITATION LIST

Patent Literature

Patent Literature 1: Japanese Patent Application Laid-open No. 2-102493

SUMMARY

Technical Problem

In the nozzle repairing method of the related art, the housing is removed from the nuclear reactor vessel by cutting, the entire groove-welding portion of the nozzle of the nuclear reactor vessel is removed along with the left housing so as to restore the groove, and the new housing is inserted into the groove-welding portion of the nozzle and is fixed by welding. Incidentally, since the nuclear reactor vessel body is generally formed of low-alloy steel, there is a need to perform a heat treatment for removing stress after the welding. However, since the inside of the nuclear reactor vessel is a high-radiation area, the heat treatment is not easily performed.

The invention is made to solve the above-described problem, and it is an object of the invention to provide a nozzle repairing method and a nuclear reactor vessel capable of improving the workability and the stress corrosion resistance by easily performing a repairing operation.

Solution to Problem

According to an aspect of the present invention, a nozzle repairing method of repairing an instrumentation nozzle in which an in-core instrument tube is inserted into an attachment hole formed in a semi-spherical portion of a nuclear reactor vessel and an inner surface side of the semi-spherical portion is groove-welded so as to fix the in-core instrument tube, includes: removing a first connection portion with respect to the in-core instrument tube in a groove-welding portion; removing the in-core instrument tube from the semi-spherical portion; leaving and grooving a second connection portion with respect to the semi-spherical portion in the groove-welding portion; inserting a new in-core instrument tube into the attachment hole; and groove-welding the inner surface side of the semi-spherical portion so as to fix the new in-core instrument tube.

Accordingly, the second connection portion with respect to the semi-spherical portion in the groove-welding portion is left for grooving, the new in-core instrument tube is inserted into the attachment hole, and the inner side of the semi-spherical portion is subjected to groove-welding so as to fix the new in-core instrument tube. Specifically, the second connection portion, that is, the existing groove-welding portion is left between the semi-spherical portion and the new groove-welding portion, and hence the new groove-welding does not have any influence on the semi-spherical portion, that is, the nuclear reactor vessel due to heat. Accordingly, since the heat treatment is not needed, the repairing operation may be easily performed and hence the workability may be improved.

Advantageously, in the nozzle repairing method, the in-core instrument tube is removed from the semi-spherical portion, and buttered welding is performed on a surface of the groove-welding portion.

Accordingly, the surface of the left second connection portion, that is, the existing groove-welding portion is covered at the new buttered welding portion, and hence the stress corrosion resistance may be improved.

Advantageously, in the nozzle repairing method, when performing the buttered welding on the surface of the groove-welding portion, the buttered welding is performed so as to extend to the inner surface of the semi-spherical portion and the buttered welding is performed so as to extend to the attachment hole.

Accordingly, the surface of the left second connection portion, that is, the existing groove-welding portion is covered at the new buttered welding portion without any gap, and hence the stress corrosion resistance may be improved.

Advantageously, in the nozzle repairing method, a welding material used when fixing the new in-core instrument tube to the semi-spherical portion is a material having stress corrosion resistance higher than that of a welding material of the groove-welding portion.

Accordingly, the stress corrosion resistance may be improved compared to the nozzle of the related art.

Advantageously, in the nozzle repairing method, an operation is performed in an air space as the periphery of at least the instrumentation nozzle.

Accordingly, various operations such as a grooving operation or a welding operation may be performed in the air space, and hence the workability may be improved.

Advantageously, in the nozzle repairing method, the flow of water is stopped at upper and lower ends of the existing in-core instrument tube, and the water inside the nuclear reactor vessel is drained so as to form the air space.

Accordingly, since the air space is formed in the entire area inside the nuclear reactor vessel, the workability may be further improved.

According to another aspect of the present invention, a nuclear reactor vessel includes: a nuclear reactor vessel body of which a lower portion is formed in a semi-spherical shape; a nuclear reactor vessel cover which is formed in a semi-spherical shape and is attached to an upper portion of the nuclear reactor vessel body; an inlet nozzle and an outlet nozzle which are installed at the side portion of the nuclear reactor vessel body; a reactor core which is disposed inside the nuclear reactor vessel body and includes a plurality of fuel assemblies; a plurality of control rods which are insertable into the fuel assemblies; a control rod driving mechanism which moves the control rods upward or downward; and a plurality of instrumentation nozzles which are installed in the lower portion of the nuclear reactor vessel body and into which a neutron flux detector is insertable. Any instrumentation nozzle of the plurality of instrumentation nozzles includes an attachment hole which is formed at the lower portion of the nuclear reactor vessel body, a first existing groove-welding portion which is formed in an upper portion of the attachment hole and is formed in a semi-spherical shape, n in-core instrument tube which penetrates the first groove-welding portion and the attachment hole, and a second groove-welding portion which has stress corrosion resistance higher than that of the first groove-welding portion fixing the in-core instrument tube to the first groove-welding portion.

Accordingly, in the repaired instrumentation nozzle, the in-core instrument tube is fixed to the lower portion of the nuclear reactor vessel body by the second groove-welding portion having high stress corrosion resistance, and hence the stress corrosion resistance of the instrumentation nozzle may be improved.

Advantageous Effects of Invention

According to the nozzle repairing method of the invention, the second connection portion with respect to the semi-spherical portion in the groove-welding portion is left for grooving, the new in-core instrument tube is inserted into the attachment hole, and the inner side of the semi-spherical portion is groove-welded so as to fix the new in-core instrument tube. Accordingly, since the heat treatment is not needed, the repairing operation may be easily performed and hence the workability may be improved. Further, according to the nuclear reactor vessel, the in-core instrument tube is fixed to the lower portion of the nuclear reactor vessel body by the second groove-welding portion having high stress corrosion resistance, and hence the stress corrosion resistance of the instrumentation nozzle may be improved.

BRIEF DESCRIPTION OF DRAWINGS

FIG. 3 is a longitudinal sectional view illustrating a pressurized water reactor.

FIG. 4 is a flowchart illustrating the nozzle repairing method of the embodiment.

FIG. 6 is a schematic diagram illustrating a conduit tube cutting operation.

FIG. 7 is a schematic diagram illustrating a water stopping cylinder attaching operation.

FIG. 10 is a schematic diagram illustrating an in-core instrument tube cutting operation.

FIG. 12 is a cross-sectional view illustrating an in-core instrument tube drawing operation.

FIG. 15A is a schematic diagram illustrating a buttered welding operation in the instrumentation nozzle.

FIG. 15B is a cross-sectional view illustrating the instrumentation nozzle subjected to the buttered welding operation.

FIG. 20B is a cross-sectional view illustrating the in-core instrument tube which is welded to the instrumentation nozzle.

DESCRIPTION OF EMBODIMENTS

Hereinafter, referring to the accompanying drawings, preferred embodiments of a nozzle repairing method and a nuclear reactor vessel according to the invention will be described in detail. Furthermore, the invention is not limited to the embodiments.

Embodiment

Figure 2:
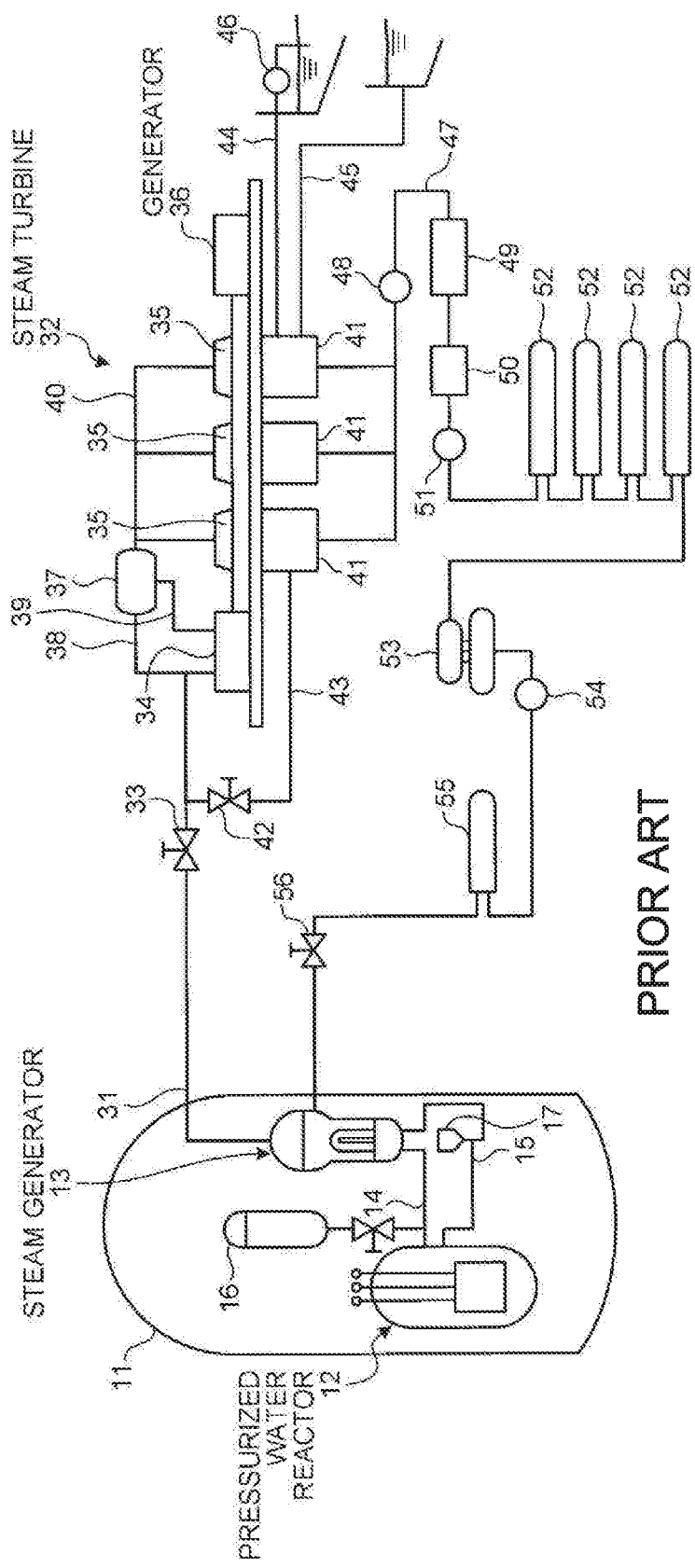
FIG. 2 is a schematic configuration diagram of a nuclear power plant.

FIG. 2 is a schematic configuration diagram of a nuclear power plant, and FIG. 3 is a longitudinal sectional view illustrating a pressurized water reactor.

A nuclear reactor of the embodiment is a pressurized water reactor (PWR) which uses light water as a nuclear reactor coolant and a neutron moderator, adjusts the water to be high-temperature and high-pressure water throughout the entire reactor core so that the light water is not boiled, sends the high-temperature and high-pressure water to a steam generator so as to generate steam by the heat exchange therebetween, and sends the steam to a turbine generator so as to generate electric power.

In the nuclear power plant with the pressurized water reactor of the embodiment, as illustrated in FIG. 2, a containment 11 accommodates a pressurized water reactor 12 and a steam generator 13, where the pressurized water reactor 12 and the steam generator 13 are connected to each other through a high temperature side feeding tube 14 and a low temperature side feeding tube 15, the high temperature side feeding tube 14 is provided with a pressurizer 16, and the low temperature side feeding tube 15 is provided with a primary cooling water pump 17. In this case, light water is used as moderator and primary cooling water (coolant), and in order to suppress the primary cooling water from being boiled at the reactor core portion, a primary cooling system is controlled by the pressurizer 16 so as to be maintained in a high-pressure state which is the atmospheric pressure of about 150 to 160.

Accordingly, in the pressurized water reactor 12, light water as primary cooling water is heated by low-enriched uranium or MOX as fuel (nuclear fuel), and the high-temperature primary cooling water is sent to the steam generator 13 through the high temperature side feeding tube 14 while the primary cooling water is maintained at a predetermined high pressure by the pressurizer 16. In the steam generator 13, the primary cooling water which is cooled by the heat exchange between the high-temperature and high-pressure primary cooling water and the secondary cooling water is returned to the pressurized water reactor 12 through the low temperature side feeding tube 15.

The steam generator 13 is connected to a steam turbine 32 through a tube 31 which feeds the heated secondary cooling water, that is, the steam, and the tube 31 is provided with a main steam isolating valve 33. The steam turbine 32 includes a high-pressure turbine 34 and a low-pressure turbine 35, and is connected with a generator (power generating device) 36. Further, a moisture separation heater 37 is provided between the high-pressure turbine 34 and the low-pressure turbine 35, a cooling water branch tube 38 which is branched from the tube 31 is connected to the moisture separation heater 37, the high-pressure turbine 34 and the moisture separation heater 37 are connected to each other by a low-temperature reheat tube 39, and the moisture separation heater 37 and the low-pressure turbine 35 are connected to each other by a high-temperature reheat tube 40.

Further, the low-pressure turbine 35 of the steam turbine 32 includes a condenser 41, and the condenser 41 is connected with a turbine bypass tube 43 which extends from the tube 31 and includes a bypass valve 42 and is connected with a water intake tube 44 and a drainage tube 45 which are used for the supply and the drainage of the cooling water (for example, the sea water). The water intake tube 44 includes a circulating water pump 46, and the other end thereof is disposed under the sea along with the drainage tube 45.

Then, the condenser 41 is connected with a tube 47, and is connected with a condensate pump 48, a ground capacitor 49, a condensate demineralizating device 50, a condensate booster pump 51, and a low-pressure water supply heater 52. Further, the tube 47 is connected with a deaerator 53, and is provided with a main water supply pump 54, a high-pressure water supply heater 55, and a main water supply control valve 56.

Accordingly, in the steam generator 13, the steam which is generated by the heat exchange with the high-temperature and high-pressure primary cooling water is sent to the steam turbine 32 (from the high-pressure turbine 34 to the low-pressure turbine 35) through the tube 31 and the steam turbine 32 is driven by the steam so as to generate electric power by a generator 36. At this time, the steam which is generated from the steam generator 13 is used to drive the high-pressure turbine 34. Then, the moisture content contained in the steam is removed by the moisture separation heater 37 and the steam is heated so as to drive the low-pressure turbine 35. Then, the steam which is used to drive the steam turbine 32 is cooled by using the sea water in the condenser 41 so as to become condensate, and is returned to the steam generator 13 through the ground capacitor 49, the condensate demineralizating device 50, the low-pressure water supply heater 52, the deaerator 53, the high-pressure water supply heater 55, and the like.

In the pressurized water reactor 12 of the nuclear power plant with such a configuration, as illustrated in FIG. 3, a nuclear reactor vessel 61 includes a nuclear reactor vessel body 62 and a nuclear reactor vessel cover (upper mirror) 63 which is attached to the upper portion thereof so that a reactor core internal structure may be inserted into the nuclear reactor vessel, where the nuclear reactor vessel cover 63 is fixed to the nuclear reactor vessel body 62 so as to be opened or closed through a plurality of stud bolts 64 and a plurality of nuts 65.

The nuclear reactor vessel body 62 is formed in a cylindrical shape of which the upper portion may be opened by separating the nuclear reactor vessel cover 63 and the lower portion is blocked by a lower mirror 66 that is formed in a semi-spherical shape. Then, the upper portion of the nuclear reactor vessel body 62 is provided with an inlet nozzle 67 which supplies light water (coolant) as primary cooling water and an outlet nozzle 68 which discharges light water. Further, the nuclear reactor vessel body 62 is provided with a main water nozzle (not illustrated) separately from the inlet nozzle 67 and the outlet nozzle 68.

Inside the nuclear reactor vessel body 62, an upper reactor core supporting plate 69 is fixed to a position above the inlet nozzle 67 and the outlet nozzle 68, and a lower reactor core supporting plate 70 is fixed so as to be positioned near the lower mirror 66. The upper reactor core supporting plate 69 and the lower reactor core supporting plate 70 are formed in a disk shape and are provided with a plurality of communication holes (not illustrated). Then, the upper reactor core supporting plate 69 is connected with an upper reactor core plate 72 which is positioned at the lower side and is provided with a plurality of communication holes (not illustrated) through a plurality of reactor core supporting rod 71.

A reactor core tank 73 which is formed in a cylindrical shape is disposed inside the nuclear reactor vessel body 62 with a predetermined gap with respect to the inner wall surface, where the upper portion of the reactor core tank 73 is connected to the upper reactor core plate 72 and the lower portion is connected to a lower reactor core plate 74 which is formed in a disk shape and is provided with a plurality of communication holes (not illustrated). Then, the lower reactor core plate 74 is supported by the lower reactor core supporting plate 70. Specifically, the reactor core tank 73 is supported while being suspended on the lower reactor core supporting plate 70 of the nuclear reactor vessel body 62.

A reactor core 75 includes the upper reactor core plate 72, the reactor core tank 73, and the lower reactor core plate 74, and a plurality of fuel assemblies 76 are arranged inside the reactor core 75. The fuel assembly 76 is formed by binding a plurality of fuel rods using a plurality of support grids (not illustrated) in a grid shape, where the upper nozzle is fixed to the upper end and the lower nozzle is fixed to the lower end. Further, a plurality of control rods 77 are arranged inside the reactor core 75. The upper ends of the plurality of control rods 77 are assembled so as to become a control rod cluster 78, and are insertable into the fuel assembly 76. A plurality of control rod cluster guide tubes 79 are fixed to the upper reactor core supporting plate 69 so as to penetrate the upper reactor core supporting plate 69, and the lower end of each control rod cluster guide tube 79 extends to the control rod cluster 78 inside the fuel assembly 76.

The upper portion of the nuclear reactor vessel cover 63 which constitutes the nuclear reactor vessel 61 is formed in a semi-spherical shape and is provided with a magnetic jack type control rod driving mechanism 80. Then, the control rod driving mechanism is accommodated inside a housing 81 which is integrated with the nuclear reactor vessel cover 63. The upper ends of the plurality of control rod cluster guide tubes 79 extend to the control rod driving mechanism 80, and a control rod cluster driving shaft 82 which extends from the control rod driving mechanism 80 passes through the control rod cluster guide tube 79, extends to the fuel assembly 76, and may grip the control rod cluster 78.

The control rod driving mechanism 80 is installed so as to extend in the up and down direction and is connected to the control rod cluster 78. Then, the control rod driving mechanism moves the control rod cluster driving shaft 82, which has a plurality of circumferential grooves formed on the surface thereof so as to be arranged at the same pitch, upward or downward by the magnetic jack, thereby controlling the output of the nuclear reactor.

Further, the nuclear reactor vessel body 62 is provided with a plurality of instrumentation nozzles 83 which penetrate the lower mirror 66. In each instrumentation nozzle 83, an in-core instrument guide tube 84 is connected to the upper end inside the reactor and a conduit tube 85 is connected to the lower end outside the reactor. In each in-core instrument guide tube 84, the upper end is connected to the lower reactor core supporting plate 70, and upper and lower adjacent plates 86 and 87 are attached thereto so as to suppress a vibration. A thimble tube 88 is attached with a neutron flux detector (not illustrated) capable of measuring a neutron flux, and is insertable to the fuel assembly 76 so as to penetrate the lower reactor core plate 74 through the instrumentation nozzle 83 and the in-core instrument guide tube 84 from the conduit tube 85.

Accordingly, the nuclear fission inside the reactor core 75 is controlled in a manner such that the control rod cluster driving shaft 82 is moved by the control rod driving mechanism 80 so as to draw the control rod 77 from the fuel assembly 76 by a predetermined amount. The light water charged inside the nuclear reactor vessel 61 is heated by the generated thermal energy, and the high-temperature light water is discharged from the outlet nozzle 68 so as to be sent to the steam generator 13 as described above. Specifically, the nuclear fuel constituting the fuel assembly 76 causes the nuclear fission so as to emit neutron, and the light water as the moderator and the primary cooling water reduces the kinetic energy of the emitted high-speed neutron so as to obtain thermal neutron. Accordingly, the new nuclear fission may be easily generated and the cooling is performed by robbing the generated heat. Meanwhile, the number of neutrons generated inside the reactor core 75 may be adjusted by inserting the control rod 77 into the fuel assembly 76, and the nuclear reactor may be emergently stopped by inserting the entire control rod 77 into the fuel assembly 76.

Further, the nuclear reactor vessel 61 is provided with an upper plenum 89 which is provided above the reactor core 55 so as to communicate with the outlet nozzle 68 and a lower plenum 90 which is provided therebelow. Then, a down cover 91 which communicates with the inlet nozzle 67 and the lower plenum 90 is formed between the nuclear reactor vessel 61 and the reactor core tank 73. Accordingly, the light water flows from the inlet nozzle 67 into the nuclear reactor vessel body 62, flows down through the down cover 91, reaches the lower plenum 90, rises while being guided upward by the spherical inner surface of the lower plenum 90, passes through the lower reactor core supporting plate 70 and the lower reactor core plate 74, and then flows into the reactor core 75. The light water which flows into the reactor core 75 absorbs thermal energy generated from the fuel assembly 76 constituting the reactor core 75 so as to cool the fuel assembly 76. Then, the light water becomes high temperature, passes through the upper reactor core plate 72, rises to the upper plenum 89, and is discharged through the outlet nozzle 68.

In the nuclear reactor vessel 61 with such a configuration, the instrumentation nozzle 83 is formed in a manner such that an in-core instrument tube is fitted into an attachment hole provided in the lower mirror 66 of the nuclear reactor vessel body 62 and the upper end of the in-core instrument tube is fixed to the inner surface of the lower mirror 66 by groove-welding. In this case, the nuclear reactor vessel body 62 is formed by buttered welding stainless steel to the inner surface of low-alloy steel as a base material, and the in-core instrument tube which is formed of a nickel base alloy is welded to the nuclear reactor vessel body 62 by a nickel base alloy while being fitted into the attachment hole of the nuclear reactor vessel body 62. For this reason, there is a possibility that stress corrosion cracking may be generated in the in-core instrument tube due to the long-time usage, and when the stress corrosion cracking is generated, there is a need to repair the instrumentation nozzle 83. However, since the nuclear reactor vessel body 62 is formed of low-alloy steel, a heat treatment for removing the stress is needed after the welding, but the heat treatment is not easily performed since a high-radiation area is formed therein.

Therefore, a nozzle repairing method of the embodiment includes: removing the first connection portion with respect to the in-core instrument tube in the existing groove-welding portion; removing the in-core instrument tube from the lower mirror (semi-spherical portion) 66; leaving and grooving the second connection portion with respect to the lower mirror 66 in the groove-welding portion; inserting the new in-core instrument tube into the attachment hole; and fixing the inner surface side of the lower mirror 66 to the new in-core instrument tube by groove-welding. At this time, the in-core instrument tube is removed from the lower mirror 66, and the buttered welding is performed on the surface of the existing groove-welding portion. For this reason, since the heat treatment of the nuclear reactor vessel body 62 is not necessary, the operation of repairing the instrumentation nozzle 83 may be easily performed, and the workability may be improved.

Figure 1:
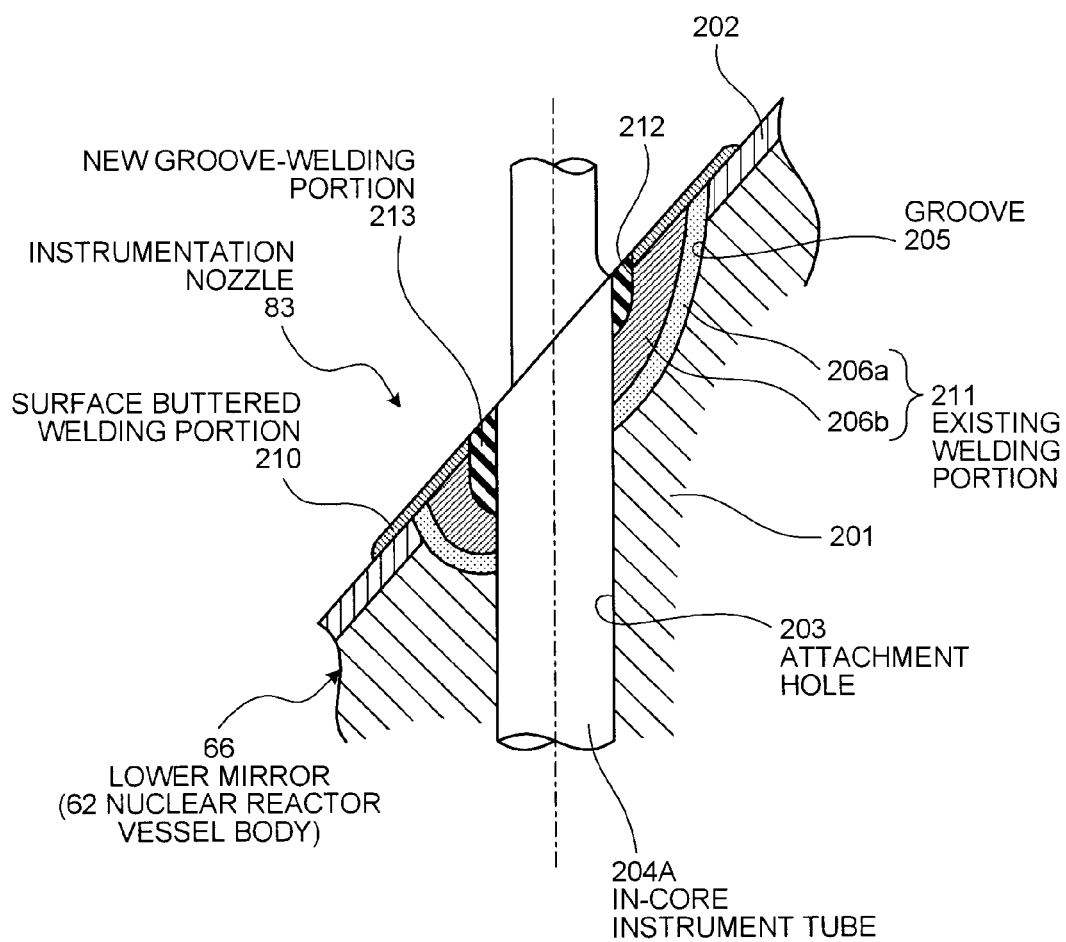
FIG. 1 is a cross-sectional view illustrating an instrumentation nozzle of a nuclear reactor vessel which is repaired by a nozzle repairing method according to an embodiment of the invention.
Figure 5A:
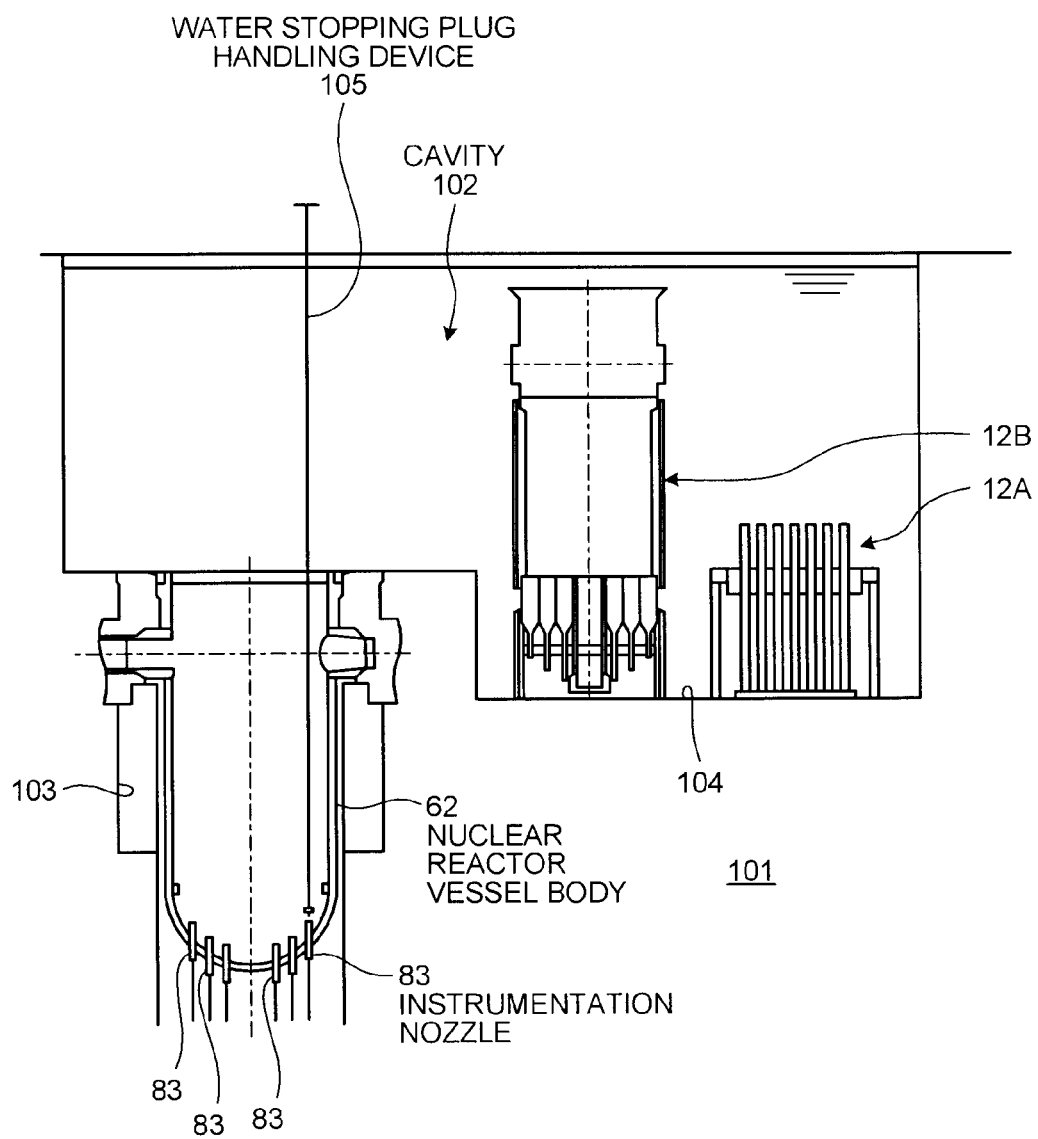
FIG. 5A is a schematic diagram of a nuclear reactor vessel illustrating a water stopping operation in an in-core instrument tube of the instrumentation nozzle.
Figure 5B:
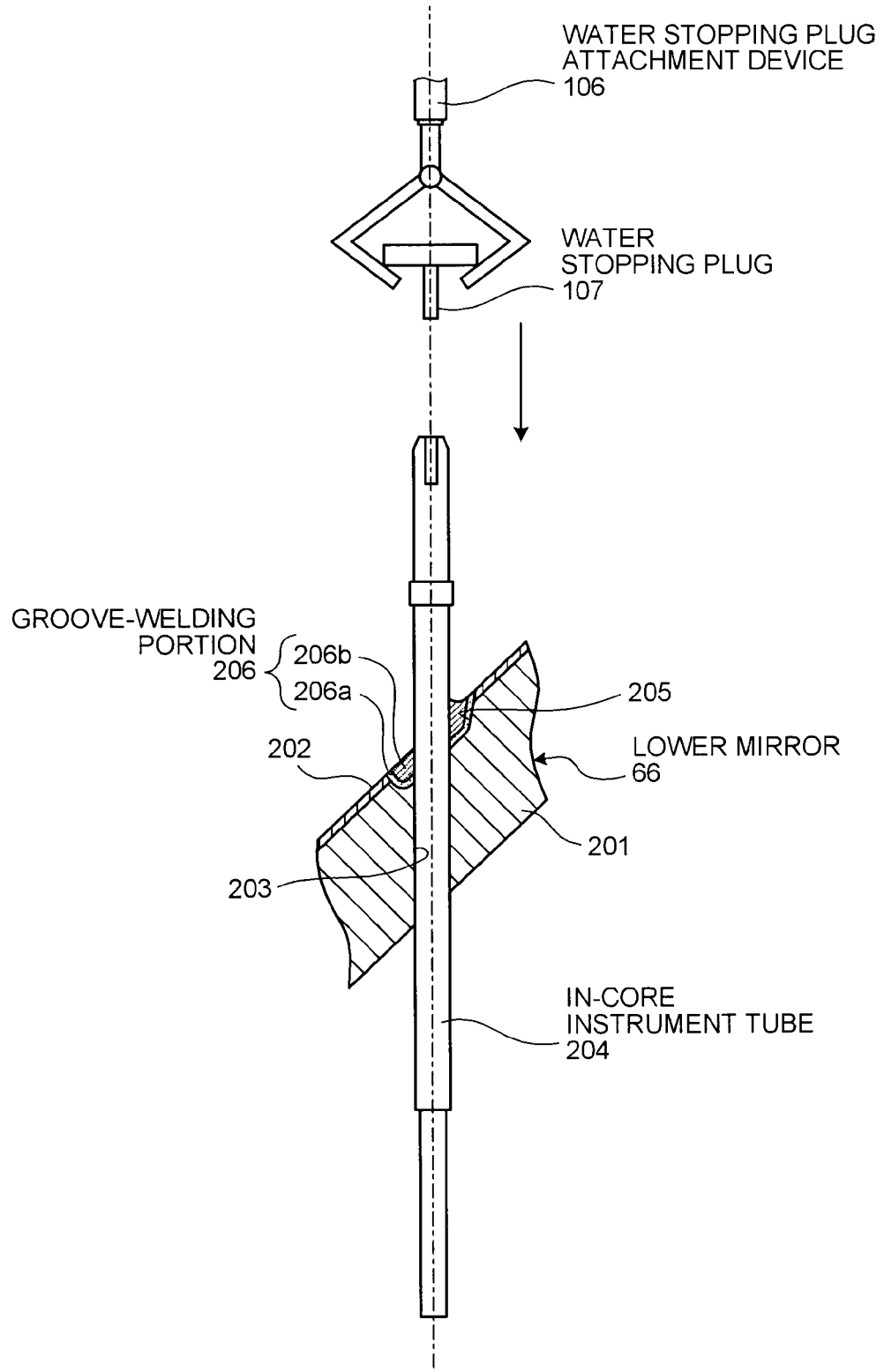
FIG. 5B is a schematic diagram illustrating the water stopping operation in the in-core instrument tube.
Figure 8:
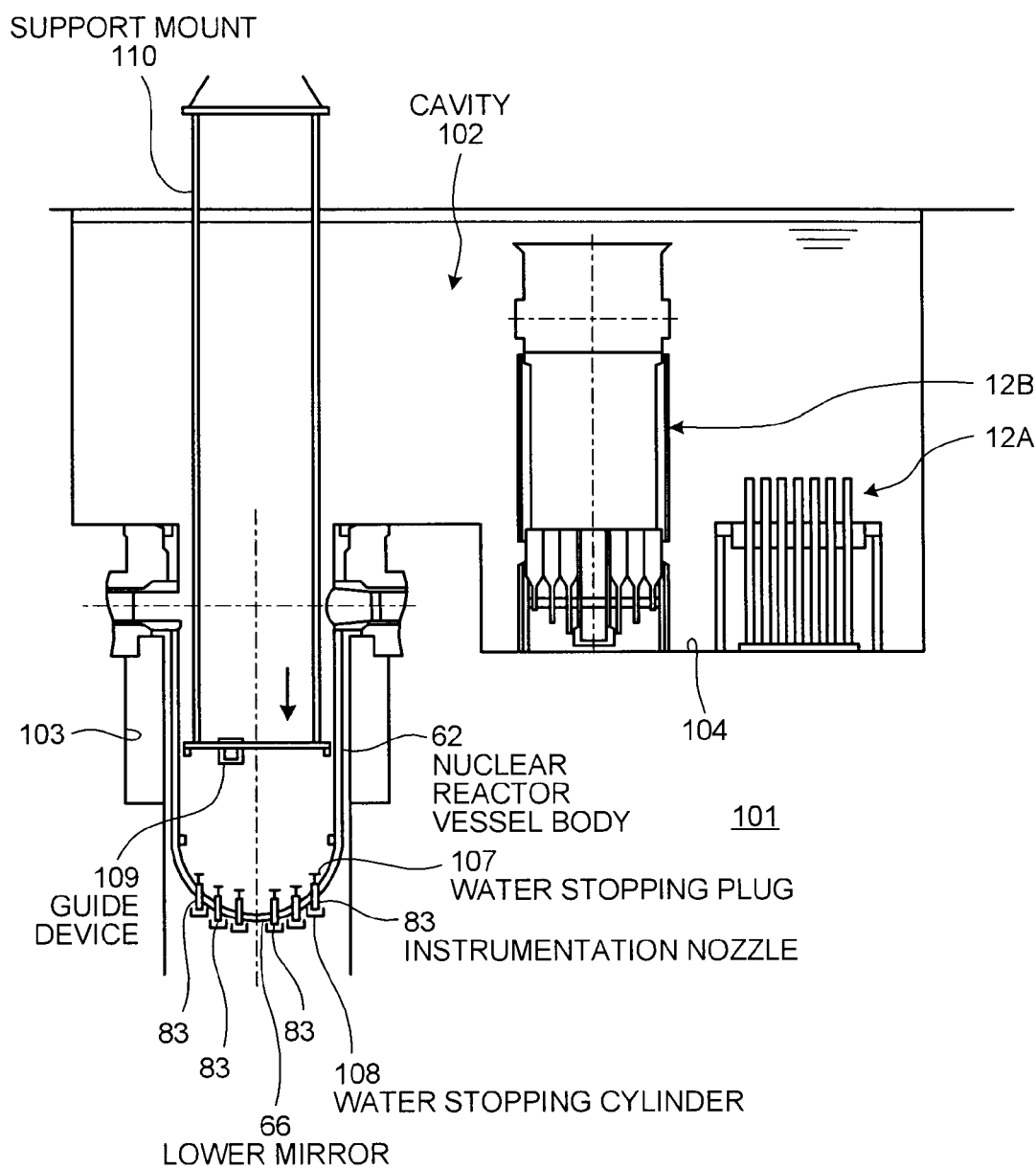
FIG. 8 is a schematic diagram illustrating an operation of installing a guide device and a support mount to the nuclear reactor vessel.
Figure 9:
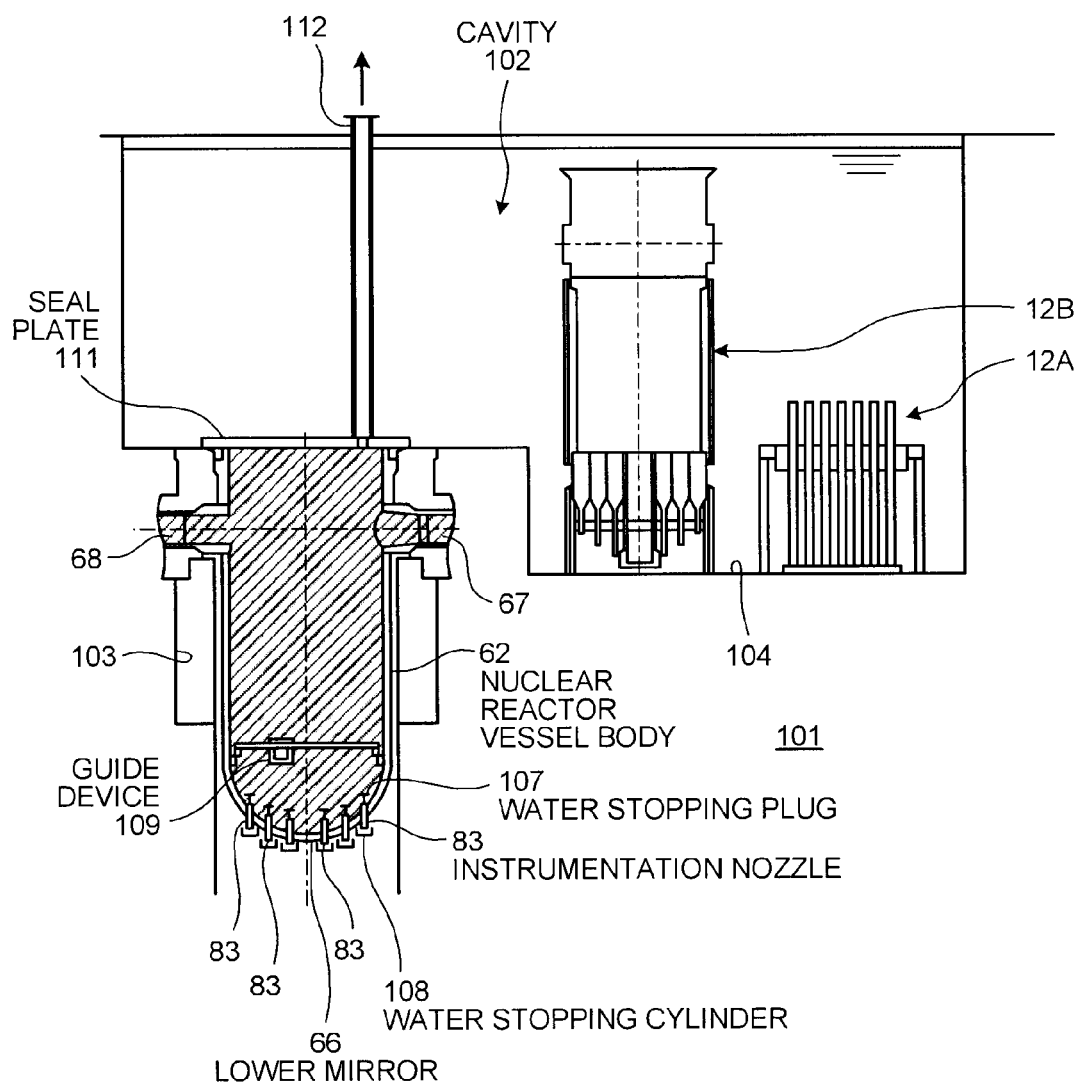
FIG. 9 is a schematic diagram illustrating an operation of draining water inside the nuclear reactor vessel.
Figure 11A:
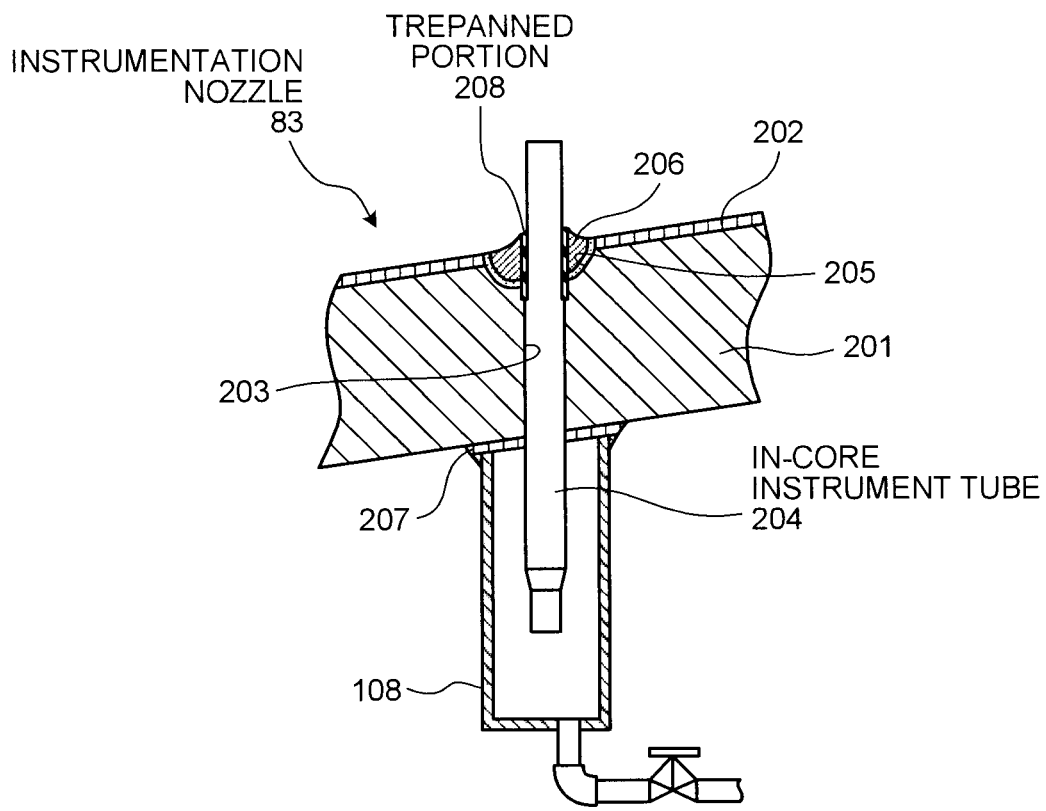
FIG. 11A is a schematic diagram illustrating an in-core instrument tube trepanning operation.
Figure 11B:
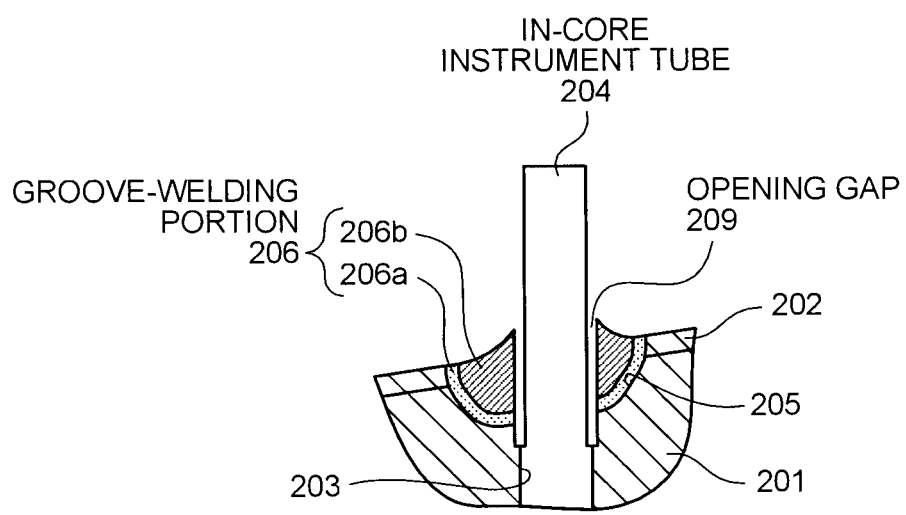
FIG. 11B is a cross-sectional view illustrating the trepanned in-core instrument tube.
Figure 13A:
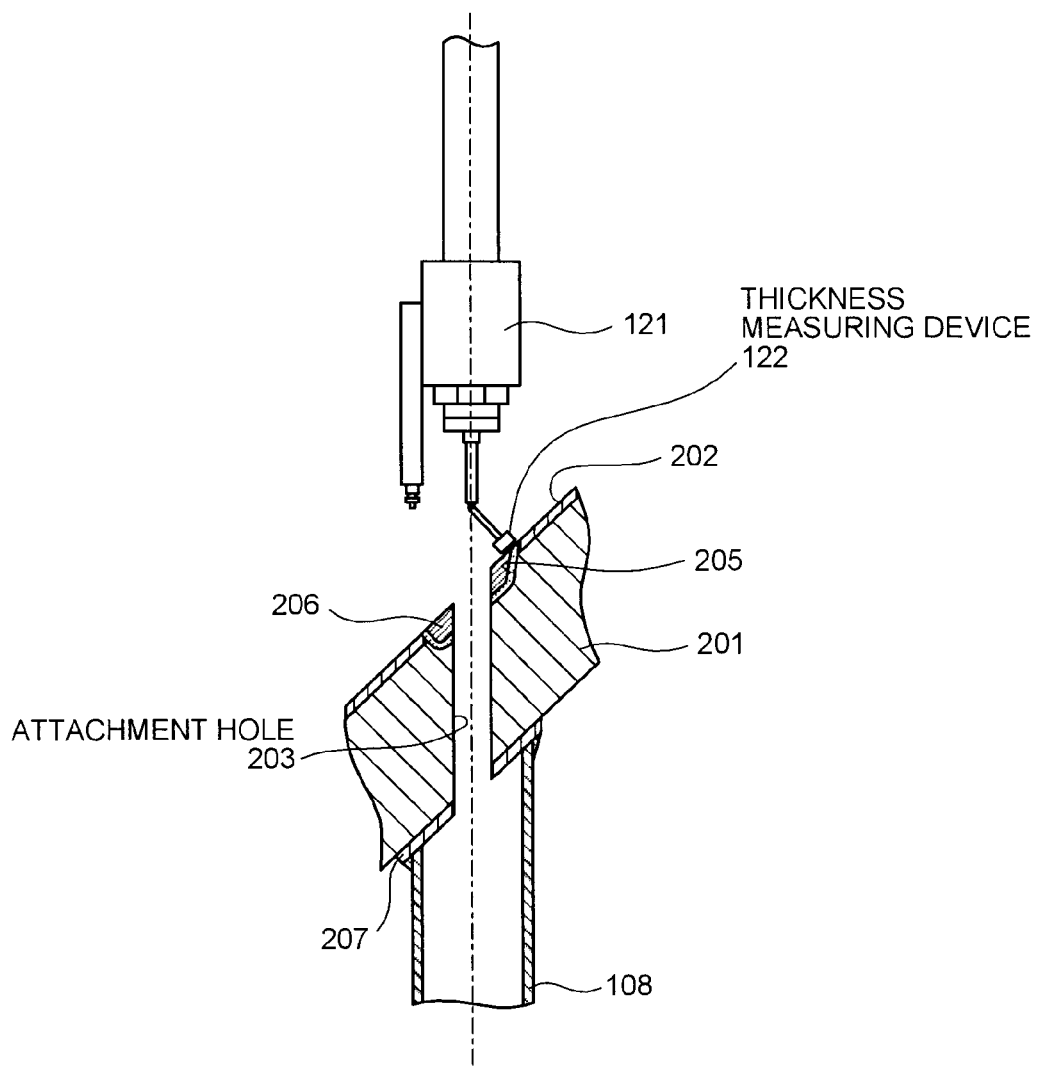
FIG. 13A is a schematic diagram illustrating an operation of measuring a thickness of a stainless steel buttered portion in the instrumentation nozzle.
Figure 13B:
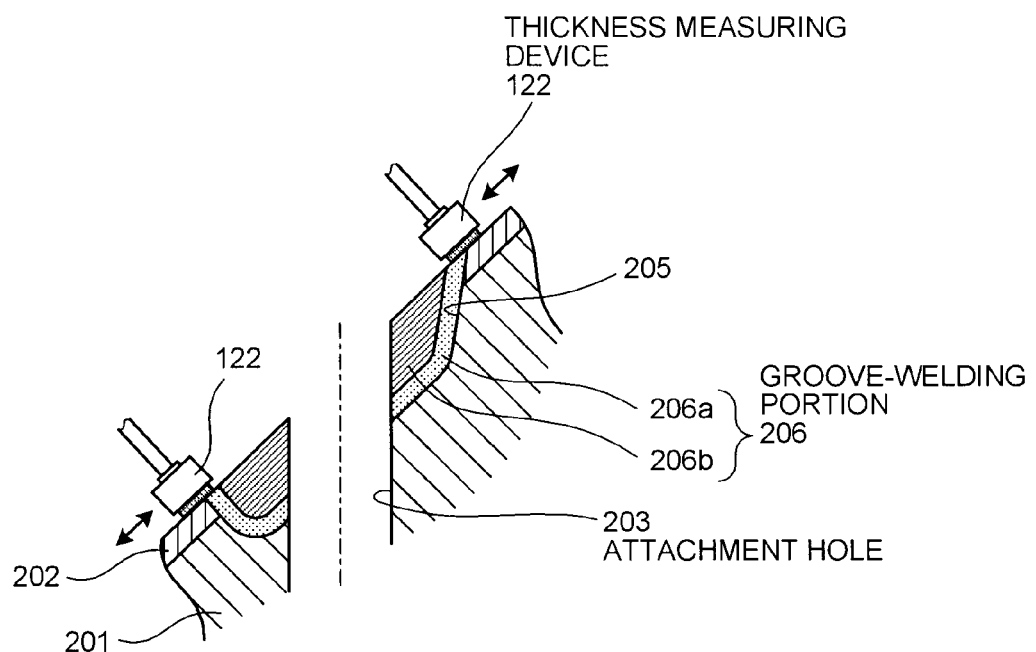
FIG. 13B is a main enlarged view illustrating the operation of measuring the thickness of the stainless steel buttered portion in the instrumentation nozzle.
Figure 14A:
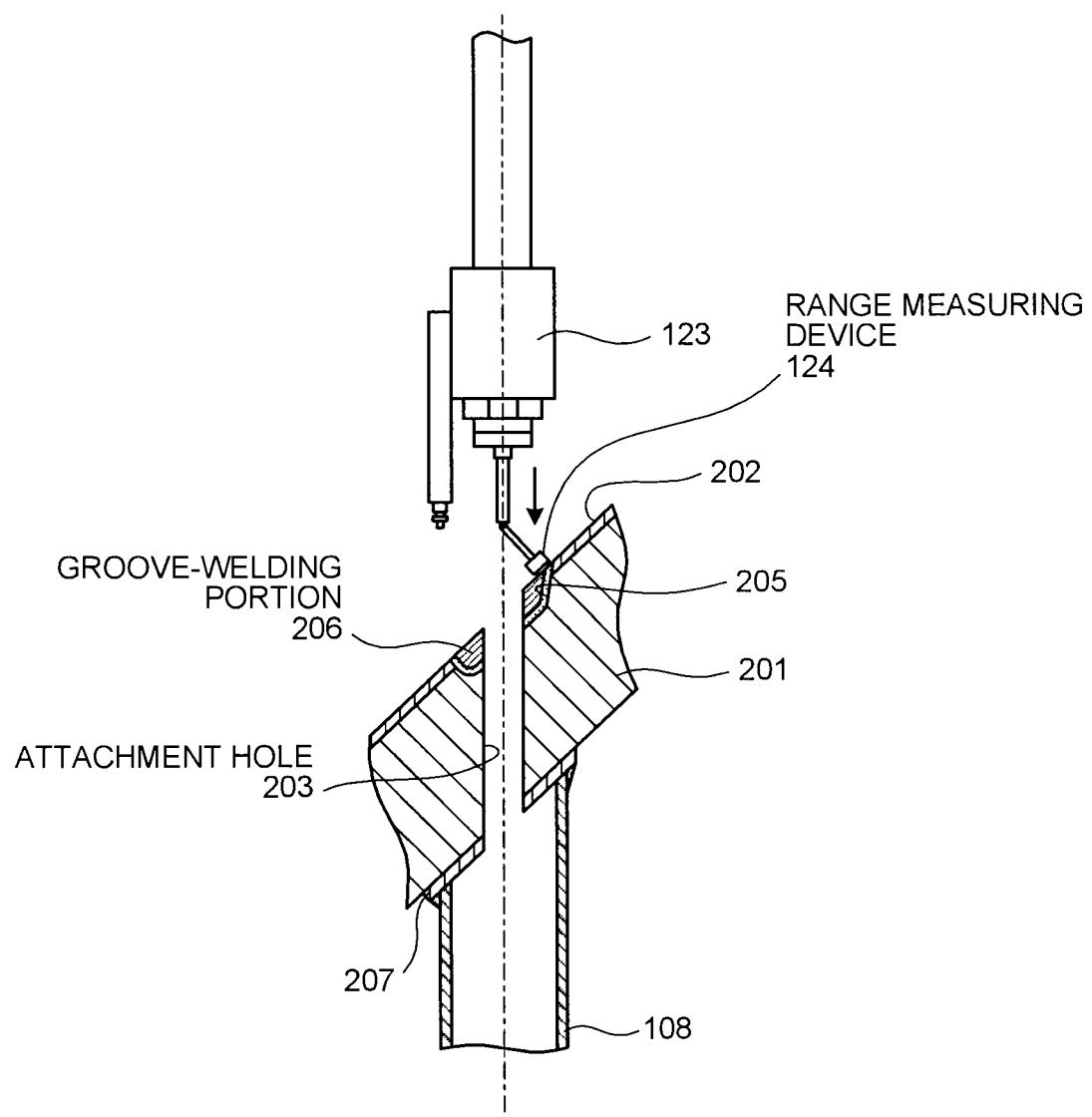
FIG. 14A is a schematic diagram illustrating an operation of measuring a range of a welding portion in the instrumentation nozzle.
Figure 14B:
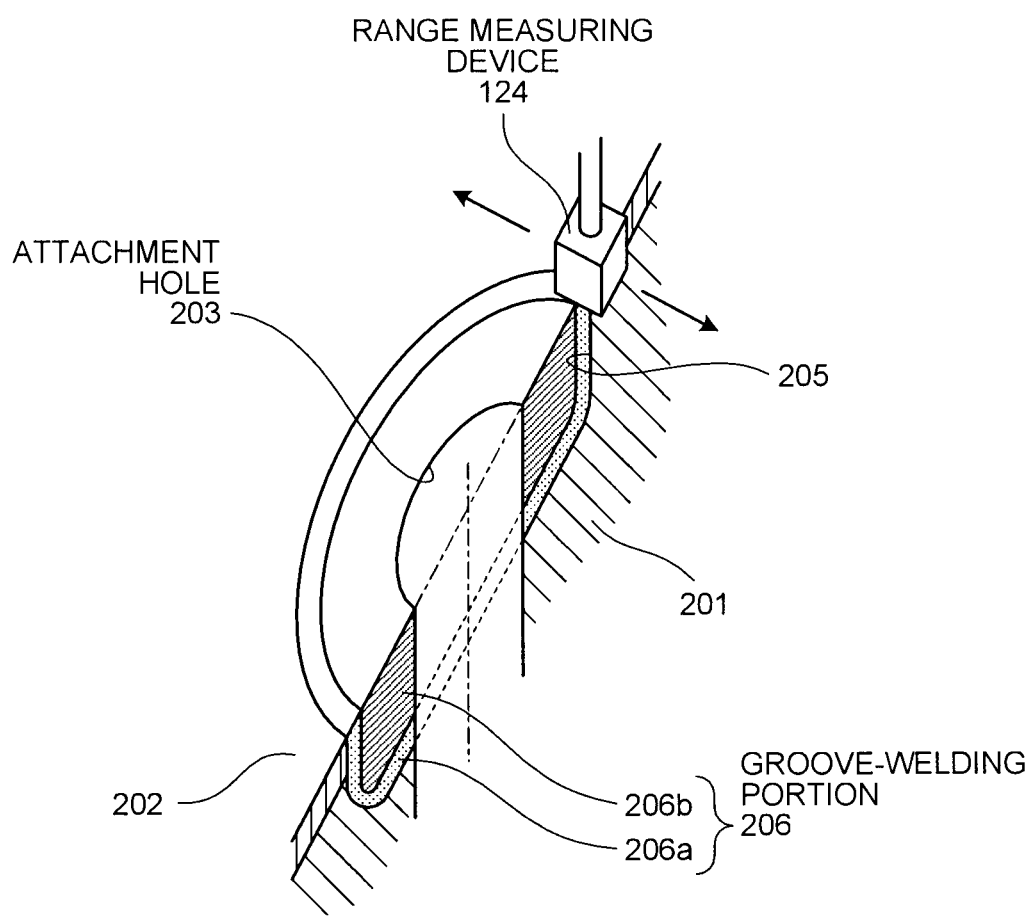
FIG. 14B is a main enlarged view illustrating the operation of measuring the range of the welding portion in the instrumentation nozzle.
Figure 16:
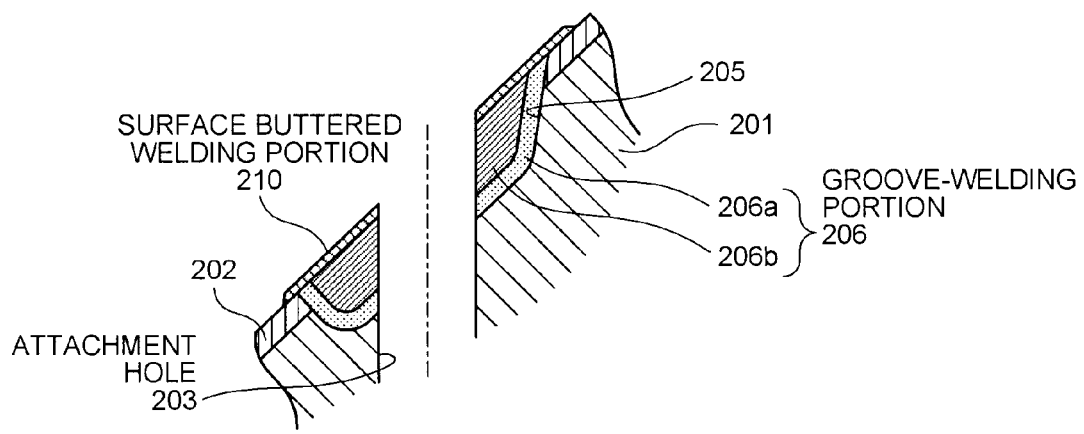
FIG. 16 is a cross-sectional view illustrating a buttered welding portion subjected to a reshaping operation in the instrumentation nozzle.
Figure 17:
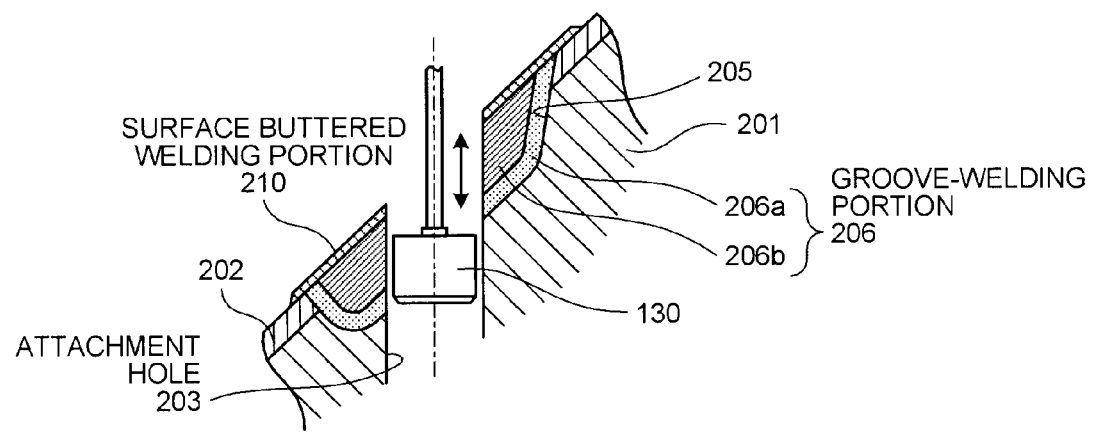
FIG. 17 is a schematic diagram illustrating an operation of measuring the welding portion in the instrumentation nozzle.
Figure 18A:
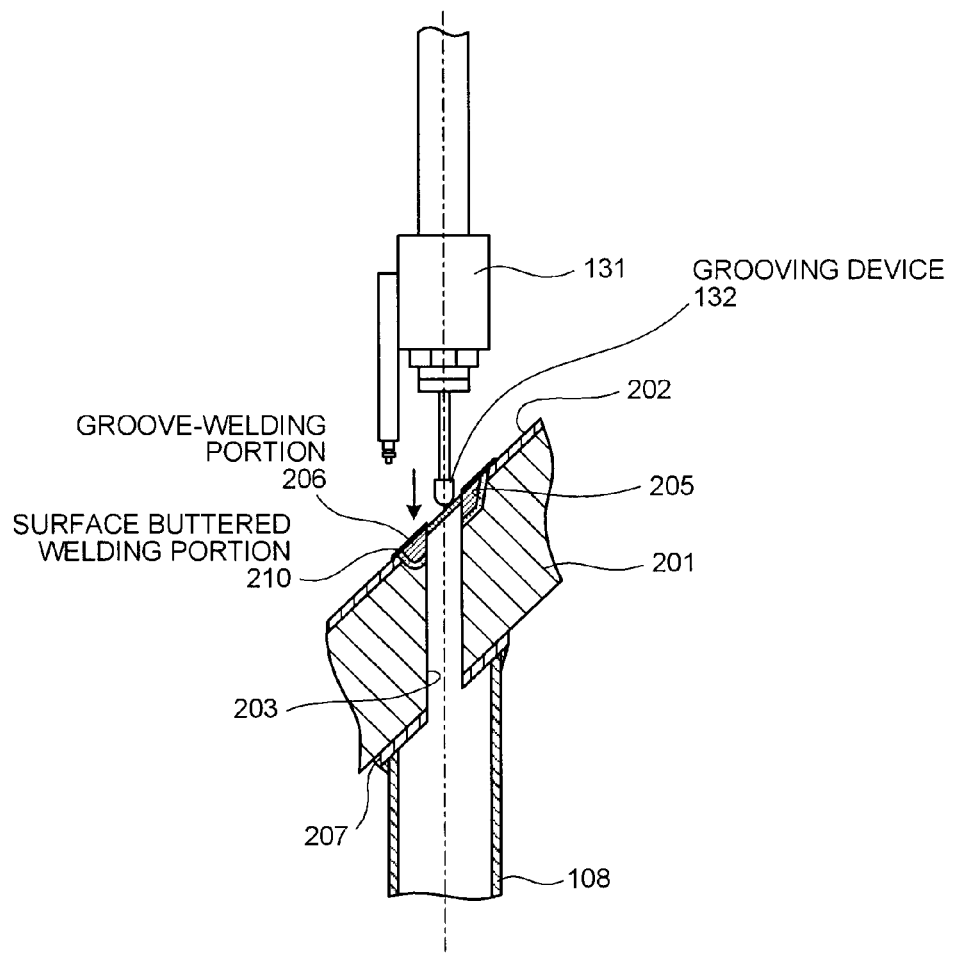
FIG. 18A is a schematic diagram illustrating an operation of grooving the welding portion in the instrumentation nozzle.
Figure 18B:
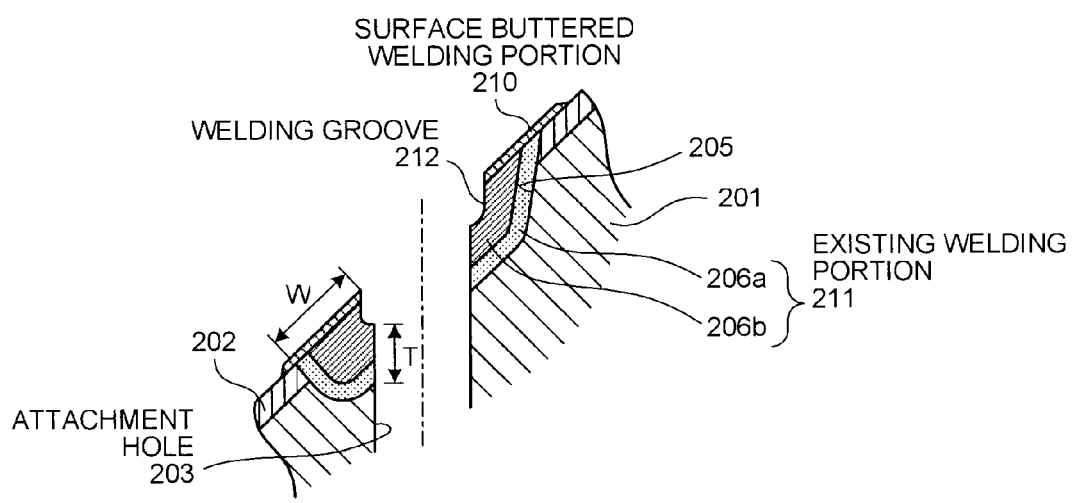
FIG. 18B is a cross-sectional view illustrating the welding portion subjected to the grooving operation in the instrumentation nozzle.
Figure 19A:
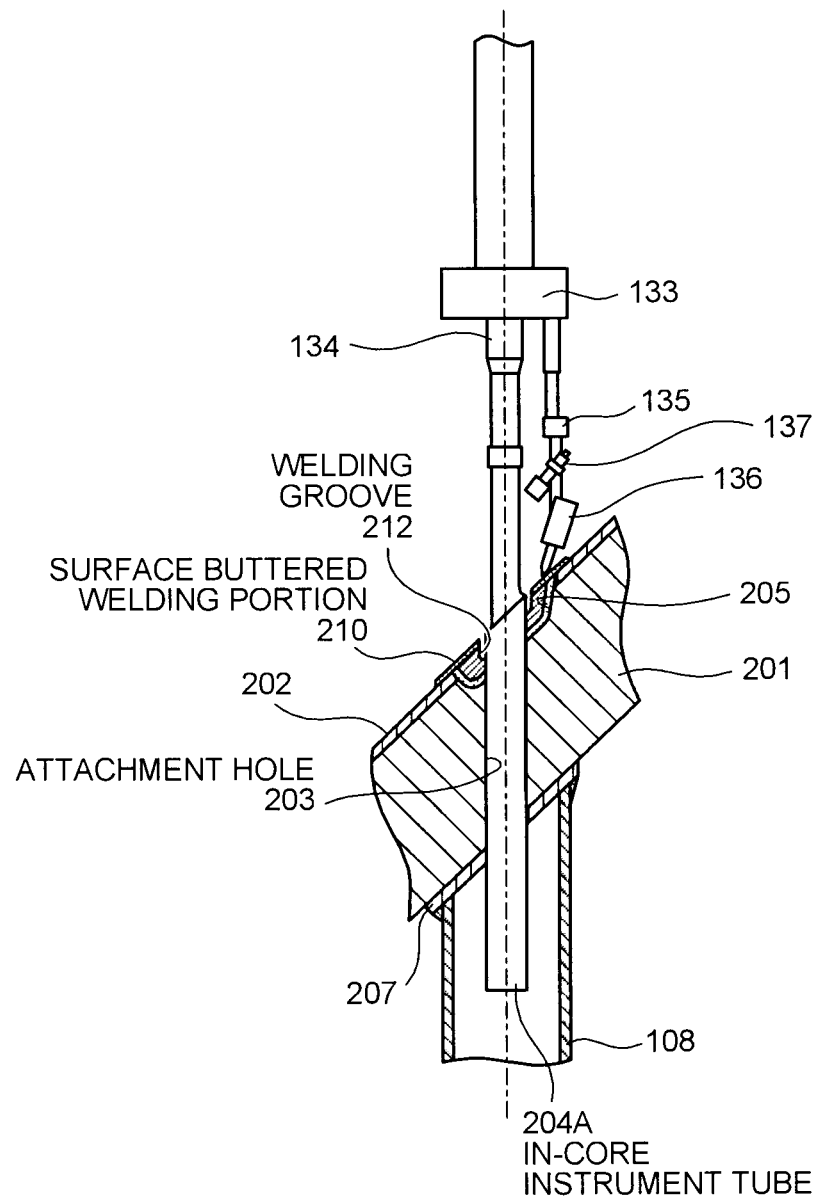
FIG. 19A is a schematic diagram illustrating an operation of inserting the in-core instrument tube into the instrumentation nozzle.
Figure 19B:
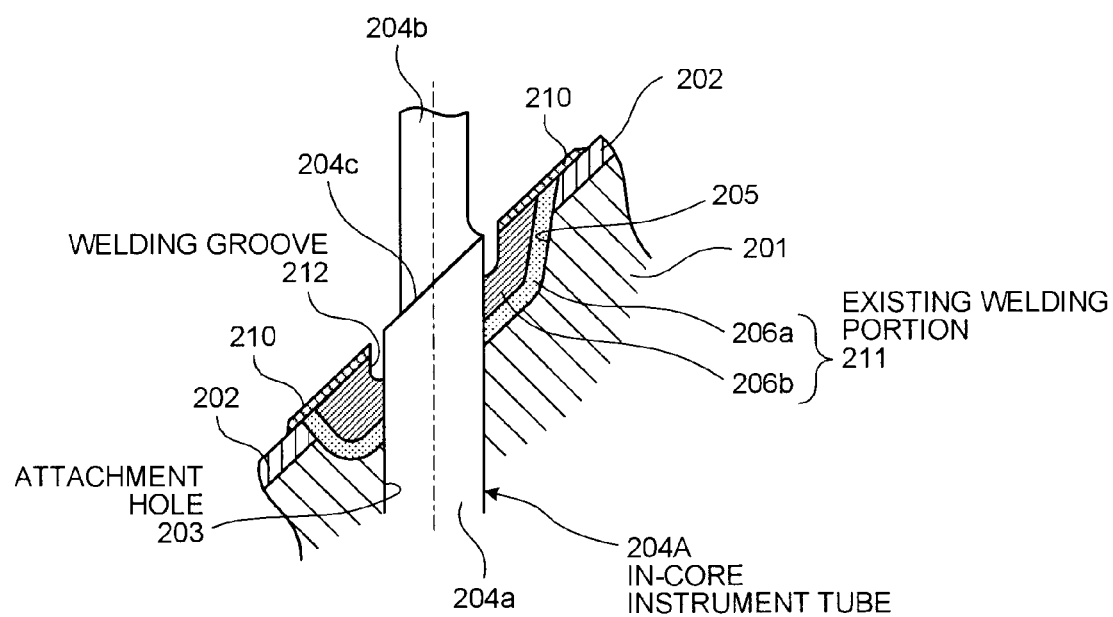
FIG. 19B is a cross-sectional view illustrating the in-core instrument tube which is inserted into the instrumentation nozzle.
Figure 20A:
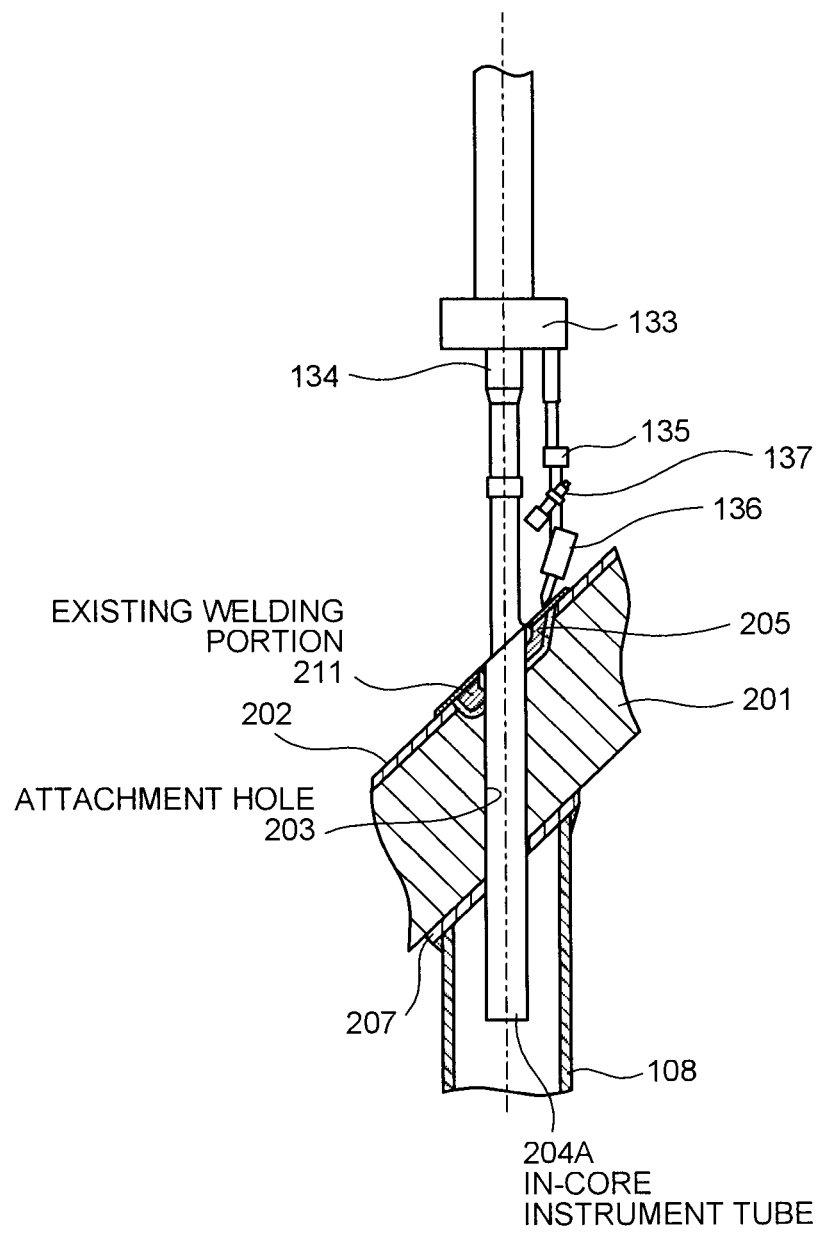
FIG. 20A is a schematic diagram illustrating an operation of welding and inspecting the in-core instrument tube in the instrumentation nozzle.
Figure 21:
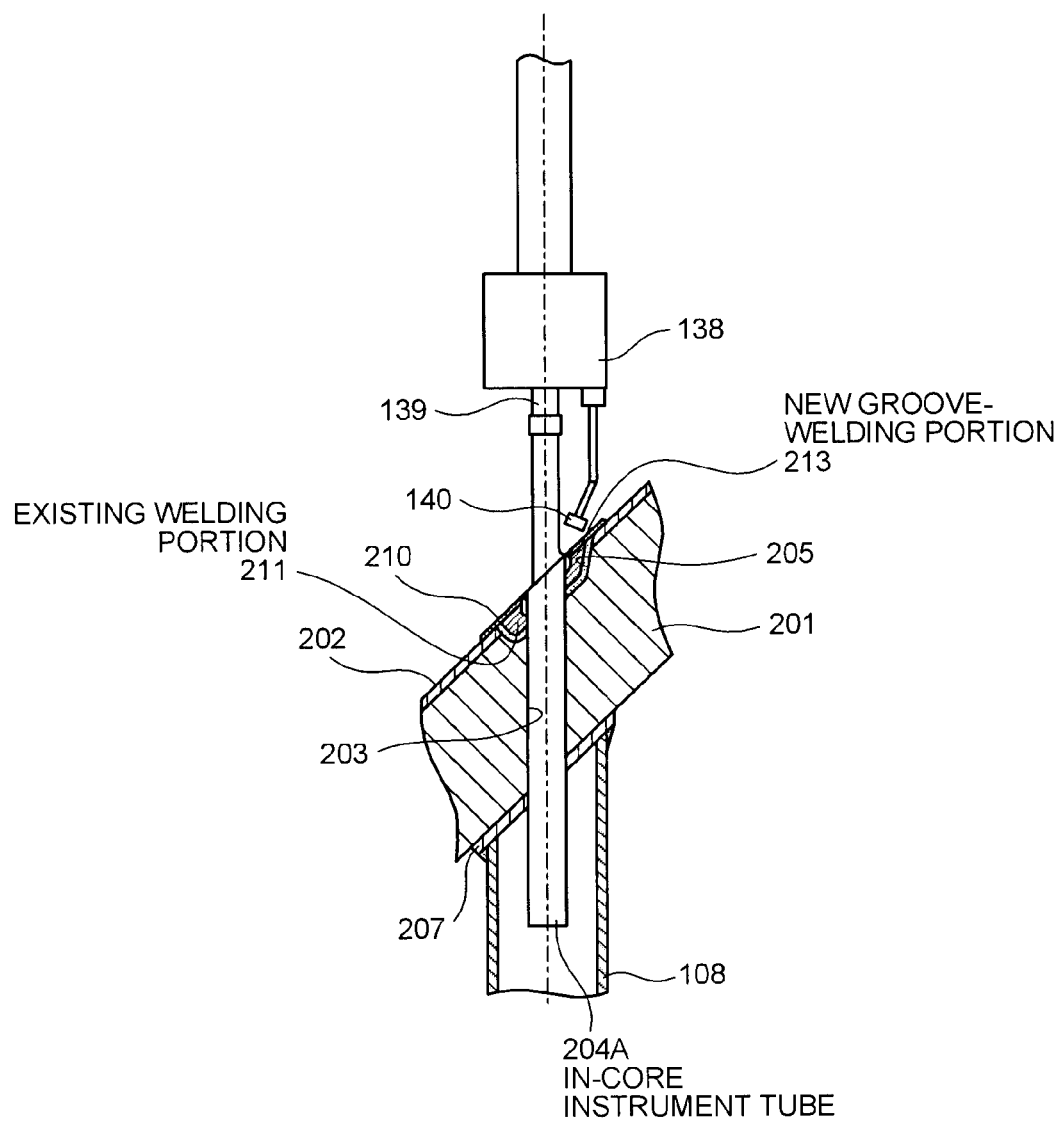
FIG. 21 is a schematic diagram illustrating an operation of inspecting the welding portion of the in-core instrument tube in the instrumentation nozzle.

FIG. 1 is a cross-sectional view illustrating an instrumentation nozzle of a nuclear reactor vessel which is repaired by a nozzle repairing method according to an embodiment of the invention, FIG. 4 is a flowchart illustrating the nozzle repairing method of the embodiment, FIG. 5A is a schematic diagram of a nuclear reactor vessel illustrating a water stopping operation in an in-core instrument tube of the instrumentation nozzle, FIG. 5B is a schematic diagram illustrating the water stopping operation in the in-core instrument tube, FIG. 6 is a schematic diagram illustrating a conduit tube cutting operation, FIG. 7 is a schematic diagram illustrating a water stopping cylinder attaching operation, FIG. 8 is a schematic diagram illustrating an operation of installing a guide device and a support mount to the nuclear reactor vessel, FIG. 9 is a schematic diagram illustrating an operation of draining water inside the nuclear reactor vessel, FIG. 10 is a schematic diagram illustrating an in-core instrument tube cutting operation, FIG. 11A is a schematic diagram illustrating an in-core instrument tube trepanning operation, FIG. 11B is a cross-sectional view illustrating the trepanned in-core instrument tube, FIG. 12 is a cross-sectional view illustrating an in-core instrument tube drawing operation, FIG. 13A is a schematic diagram illustrating an operation of measuring a thickness of a stainless steel buttered portion in the instrumentation nozzle, FIG. 13B is a main enlarged view illustrating the operation of measuring the thickness of the stainless steel buttered portion in the instrumentation nozzle, FIG. 14A is a schematic diagram illustrating an operation of measuring a range of a welding portion in the instrumentation nozzle, FIG. 14B is a main enlarged view illustrating the operation of measuring the range of the welding portion in the instrumentation nozzle, FIG. 15A is a schematic diagram illustrating a buttered welding operation in the instrumentation nozzle, FIG. 15B is a cross-sectional view illustrating the instrumentation nozzle subjected to the buttered welding operation, FIG. 16 is a cross-sectional view illustrating a buttered welding portion subjected to a reshaping operation in the instrumentation nozzle, FIG. 17 is a schematic diagram illustrating an operation of measuring the welding portion in the instrumentation nozzle, FIG. 18A is a schematic diagram illustrating an operation of grooving the welding portion in the instrumentation nozzle, FIG. 18B is a cross-sectional view illustrating the welding portion subjected to the grooving operation in the instrumentation nozzle, FIG. 19A is a schematic diagram illustrating an operation of inserting the in-core instrument tube into the instrumentation nozzle, FIG. 19B is a cross-sectional view illustrating the in-core instrument tube which is inserted into the instrumentation nozzle, FIG. 20A is a schematic diagram illustrating an operation of welding and inspecting the in-core instrument tube in the instrumentation nozzle, FIG. 20B is a cross-sectional view illustrating the in-core instrument tube which is welded to the instrumentation nozzle, and FIG. 21 is a schematic diagram illustrating an operation of inspecting the welding portion of the in-core instrument tube in the instrumentation nozzle.

Hereinafter, the nozzle repairing method of the embodiment will be described in detail by using the flowchart of FIG. 4 and the schematic diagrams of FIGS. 5A to 21.

As illustrated in FIGS. 4 and 5A, in step S11, the nuclear reactor vessel cover 63 is separated from the nuclear reactor vessel body 62 constituting the nuclear reactor vessel 61 in the pressurized water reactor 12, and the reactor core internal structure (A upper reactor core internal structure 12A and a lower reactor core internal structure 12B) accommodated therein is removed. In this case, a nuclear reactor building 101 is provided with a cavity 102 which may store cooling water therein, and an apparatus temporary placing pool 104 is formed adjacent to a nuclear reactor pool 103 where the pressurized water reactor 12 is supported in a suspended state. For this reason, the upper reactor core internal structure 12A and the lower reactor core internal structure 12B are temporarily placed while being immersed into the cooling water in the apparatus temporary placing pool 104.

As illustrated in FIG. 5B, the nuclear reactor vessel body 62 is formed by forming a buttered welding layer 202 using stainless steel on the inner surface of a base material 201 which is formed of low-alloy steel. Then, the instrumentation nozzle 83 is formed in a manner such that an in-core instrument tube 204 formed of a nickel base alloy (for example, inconel 600/trademark) is inserted and positioned into an attachment hole 203 formed in the lower mirror 66 of the nuclear reactor vessel body 62 in the vertical direction and a groove-welding portion 206 (a lower welding portion 206a and a main welding portion 206b) which is formed of a nickel base alloy (for example, inconel 600) is provided with respect to a groove 205 which is formed at the inner surface side of the lower mirror 66.

As illustrated in FIGS. 4, 5A, and 5B, in step S12, a water stopping plug handling device 105 is installed above the cavity 102 and a water stopping plug 107 moves downward inside the cooling water of the cavity 102 while being gripped by a water stopping plug attachment device 106. Then, the water stopping plug 107 is fitted to the upper end of the in-core instrument tube 204 constituting the instrumentation nozzle 83 of the nuclear reactor vessel body 62 so as to plug the upper end. Further, as illustrated in FIGS. 4 and 6, in step S13, the conduit tube 85 which is connected to the lower end of the in-core instrument tube 204 is cut, and as illustrated in FIGS. 4 and 7, in step S14, a water stopping cylinder 108 is fixed to the lower portion of the instrumentation nozzle 83.

In this case, the water stopping cylinder 108 includes a casing 108a of which an upper end is opened and a lower end is closed, a tube 108b which is connected to the lower portion of the casing 108a, and an opening and closing valve 108c which is installed in the tube 108b. Meanwhile, the outer surface of the lower mirror 66 is provided with a buttered welding layer 207 which is formed of stainless steel. For this reason, the water stopping cylinder 108 is fixed in a manner such that the upper end of the casing 108a is welded to the buttered welding layer 207 of the lower mirror 66 so as to cover the lower portion of the in-core instrument tube 204 from the downside.

When the flow of water is stopped at the upper and lower ends of the existing in-core instrument tube 204 in the instrumentation nozzle 83, an air space is formed by draining the water inside the nuclear reactor vessel body 62. Specifically, as illustrated in FIGS. 4 and 8, in step S15, a support mount 110 attached with a guide device 109 moves downward inside the cooling water from the upside of the cavity 102, and the height of the guide device 109 is adjusted so that the guide device is disposed at a predetermined height position. Then, as illustrated in FIGS. 4 and 9, in step S16, when the guide device 109 is installed inside the nuclear reactor vessel body 62, the flow of water is stopped at the upper end of the nuclear reactor vessel body 62 by a seal plate 111, and a guide tube 112 is connected thereto. In this state, a drying device (not illustrated) is installed above the cavity 102, and the cooling water inside the nuclear reactor vessel body 62 is discharged through the guide tube 112 by the underwater pump, thereby forming an air space (indicated by the hatched line in the FIG. 9) inside the reactor. In this case, the flow of water in the inlet nozzle 67 and the outlet nozzle 68 of the nuclear reactor vessel body 62 is also stopped. Then, when the air space is formed inside the nuclear reactor vessel body 62, the water stopping plug 107 is separated from the upper end of the in-core instrument tube 204 of the instrumentation nozzle 83.

Furthermore, here, the flow of water is stopped at the upper end of the nuclear reactor vessel body 62 by the seal plate 111, and the entire water therein is discharged to the outside. However, a casing (not illustrated) may surround the instrumentation nozzle 83, and the cooling water inside the casing may be discharged so as to form the air space.

When the air space is formed inside the nuclear reactor vessel body 62, various operations may be performed inside the nuclear reactor vessel body 62. However, various devices are carried into the nuclear reactor vessel body 62 through the guide tube 112, and are used while being supported by the guide device 109.

As illustrated in FIGS. 4 and 10, in step S17, the upper portion of the in-core instrument tube 204 in the instrumentation nozzle 83 is cut (or broken) by using a cutter (not illustrated), and the cut upper portion of the in-core instrument tube 204 is collected. As illustrated in FIGS. 4 and 11A, in step S18, the groove-welding portion 206 of the in-core instrument tube 204 fixed to the lower mirror 66 is subjected to a trepanning process (so as to become a trepanned portion 208) by using a cutting machine (not illustrated), and as illustrated in FIG. 11B, a opening gap 209 is formed between the in-core instrument tube 204 and the groove-welding portion 206. Specifically, the trepanned portion 208 as the first connection portion with respect to the in-core instrument tube 204 in the groove-welding portion 206 is removed. At this time, the trepanning process is performed from the upper end of the groove-welding portion 206, that is, the inner surface side of the lower mirror 66 to the lower side of the groove-welding portion 206, that is, the base material 201 of the lower mirror 66. Furthermore, when performing the trepanning process on the groove-welding portion 206 of the in-core instrument tube 204 using the cutting machine, produced chips are collected by a suctioning device (not illustrated).

As illustrated in FIGS. 4 and 12, in step S19, the in-core instrument tube 204 is extracted and removed upward from the attachment hole 203 of the lower mirror 66 using an extracting device (not illustrated), and is collected. As illustrated in FIG. 4, in step S20, the groove-welding portion 206 is inspected. First, as illustrated in FIGS. 13A and 13B, a thickness measuring device (ultrasonic inspection device) 122 which is attached to a processing head 121 moves along the surface of the buttered welding layer 202 around the groove-welding portion 206 so as to measure the thickness of the buttered welding layer 202, and it is checked whether the thickness of the buttered welding layer 202 is a predetermined thickness or more. Next, as illustrated in FIGS. 14A and 14B, a range measuring device (eddy current inspection device) 124 attached to a processing head 123 moves along the surface of the groove-welding portion 206 so as to measure the range of the groove-welding portion 206, and it is checked whether the range of the groove-welding portion 206 is a predetermined range or more.

As illustrated in FIGS. 4 and 15A, in step S21, buttered welding is performed on the surface of the groove-welding portion 206 by using a buttered welding device 125. Specifically, as illustrated in FIGS. 15A and 15B, first, a donut-like tab plate 127 is positioned at the inside of the groove-welding portion 206, that is, the upper end of the attachment hole 203 by using a support rod 126, and a welding head 128 moves along the surface of the groove-welding portion 206 so as to perform buttered welding on the surface of the groove-welding portion 206, thereby forming a surface buttered welding portion 210. At this time, the welding head 128 moves to the inner surface of the lower mirror 66 (buttered welding layer 202) over the surface of the groove-welding portion 206 and moves to the surface of the tab plate 127 while monitoring the processing state using a camera 129, thereby extending the surface buttered welding portion 210 to the lower mirror 66 and the attachment hole 203.

In this case, two layers or more of the buttered welding are performed on the surface of the groove-welding portion 206, and a thickness measuring device (penetration inspection device) not illustrated in the drawings moves along the surface of the surface buttered welding portion 210 so as to measure the thickness of the surface buttered welding portion 210. At this time, it is checked whether the thickness of the surface buttered welding portion 210 is a predetermined thickness or more. Then, as illustrated in FIG. 16, the tab plate 127 is removed by using a cutting machine (not illustrated), and the surface buttered welding portion 210 extending to the attachment hole 203 is removed and reshaped. Further, as illustrated in FIG. 17, the thickness (depth) of the groove-welding portion 206 in the attachment hole 203 is measured by using a lower buttered thickness measuring device (eddy current inspection device) 130, and it is checked whether the thickness of the groove-welding portion 206 is a predetermined thickness or more.

As illustrated in FIGS. 4 and 18A, in step S22, the groove-welding portion 206 (main welding portion 206b) is subjected to grooving by using a grooving device 132 attached to a processing head 131. Specifically, as illustrated in FIGS. 18A and 18B, in the groove-welding portion 206 which is formed in a semi-spherical shape and is provided around the attachment hole 203 in the inner surface of the lower mirror 66, the upper end near the attachment hole 203 is subjected to grooving, so that an existing welding portion 211 which has a predetermined width W in the surface direction of the lower mirror 66 and a predetermined thickness T in the thickness direction of the lower mirror 66 is left, thereby forming a welding groove 212. Specifically, the welding groove 212 is formed by leaving the existing welding portion 211 as the second connection portion with respect to the base material 201 of the lower mirror 66 in the groove-welding portion 206. At this time, a penetration inspection device (not illustrated) moves along the surface of the welding groove 212 so as to inspect the welding groove 212.

As illustrated in FIGS. 4 and 19A, in step S23, a new in-core instrument tube 204A formed of nickel base alloy (for example, inconel 690) is prepared, the upper end of the new in-core instrument tube 204A is restrained by a restraining device 134 provided in a processing head 133, and the in-core instrument tube 204A is inserted into the attachment hole 203 of the lower mirror 66 from the upside. In this case, the new in-core instrument tube 204A includes a body 204a which is fitted into the attachment hole 203 of the lower mirror 66, a small diameter portion 204b which is continuous to the upper end of the body 204a and has a small outer diameter, and an inclined portion 204c which is provided between the body 204a and the small diameter portion 204b and is formed along the inner surface of the lower mirror 66. The small diameter portion 204b is provided in consideration of the processes of various devices when fixing the new in-core instrument tube 204A by welding. Then, as illustrated in FIGS. 19A and 19B, the new in-core instrument tube 204A is positioned with respect to the lower mirror 66, and the in-core instrument tube 204A is temporarily welded by using a welding head 136 of a welding device 135 provided in the processing head 133.

As illustrated in FIGS. 4 and 20A, in step S24, the new in-core instrument tube 204A which is temporarily welded to the attachment hole 203 of the lower mirror 66 is fixed by groove-welding. Specifically, as illustrated in FIGS. 20A and 20B, the welding head 136 of the welding device 135 moves along the welding groove 212 while monitoring the welding groove 212 by a camera 137, thereby fixing the outer peripheral portion of the in-core instrument tube 204A by groove-welding so as to form a new groove-welding portion 213.

In this case, as the material of the new in-core instrument tube 204A fixed to the lower mirror 66 and the welding material used to fix the in-core instrument tube 204A, it is desirable to use nickel base alloy (for example, inconel 690) as the welding material having stress corrosion resistance higher than that of nickel base alloy (for example, inconel 600) as the welding material of the existing in-core instrument tube 204 or the groove-welding portion 206. However, the material of the new in-core instrument tube 204A and the welding material of the new groove-welding portion 213 may be the same as that of the existing in-core instrument tube 204 or the groove-welding portion 206. For example, both materials may be formed of stainless steel. Further, it is desirable that the welding material of the surface buttered welding portion 210 be also formed of nickel base alloy (for example, inconel 690) as the welding material having high stress corrosion resistance. The same material may be used, and stainless steel may be used.

As illustrated in FIGS. 4 and 21, in step S25, the new groove-welding portion 213 is inspected. Specifically, the in-core instrument tube 204A is supported by a support portion 139 of a processing head 138, and it is checked whether the inclination (standing angle) of the in-core instrument tube 204A is within a predetermined range by an inclinometer (not illustrated). Further, a penetration inspection device 140 moves along the surface of the new groove-welding portion 213 so as to inspect the new groove-welding portion 213, and it is checked whether any cracking is present. Then, as illustrated in FIG. 4, in step S26, the conduit tube 85 is connected to the repaired instrumentation nozzle 83, the cooling water is put into the nuclear reactor vessel body 62, various devices such as the seal plate 111 are removed, the reactor core internal structure (the upper reactor core internal structure 12A and the lower reactor core internal structure 12B) is returned into the nuclear reactor vessel body 62, and the nuclear reactor vessel cover 63 is attached to the nuclear reactor vessel body so as to be recovered.

In the repaired instrumentation nozzle 83, as illustrated in FIG. 1, with regard to the attachment hole 203 of the nuclear reactor vessel body 62 in which the buttered welding layer 202 formed of stainless steel is provided in the inner surface of the base material 201 formed of low-alloy steel, the inner surface side is provided with the existing groove-welding portion (first groove-welding portion) 206 which is formed in a semi-spherical shape, the in-core instrument tube 204A formed of nickel base alloy is inserted into the groove-welding portion 206 and the attachment hole 203 so as to be positioned thereto, the new groove-welding portion (second groove-welding portion) 213 formed of nickel base alloy having stress corrosion resistance higher than that of the groove-welding portion 206 is provided in the welding groove 212 of the groove-welding portion 206, and the in-core instrument tube 204A is fixed by the new groove-welding portion 213.

In this way, the nozzle repairing method of the embodiment includes: removing the first connection portion (trepanned portion) 208 with respect to the in-core instrument tube 204 in the groove-welding portion 206; removing the in-core instrument tube 204 from the lower mirror 66; leaving and grooving the second connection portion (existing welding portion) 211 with respect to the lower mirror 66 in the groove-welding portion 206; inserting the new in-core instrument tube 204A into the attachment hole 203; and fixing the new in-core instrument tube 204A by performing groove-welding (so as to form the new groove-welding portion 213) on the inside of the lower mirror 66.

Accordingly, the existing welding portion 211 in the groove-welding portion 206 is left and processed, the new in-core instrument tube 204A is inserted into the existing welding portion 211 and the attachment hole 203, and the inner side of the lower mirror 66 is subjected to groove-welding so that the in-core instrument tube 204A is fixed by the new groove-welding portion 213. Specifically, when the existing welding portion 211 is left between the lower mirror 66 and the groove-welding portion 206 and groove-welding is performed so that the in-core instrument tube 204A is fixed by the new groove-welding portion 213, the new groove-welding portion 213 practically does not influence the base material 201 of the lower mirror 66 due to heat. Here, since the heat treatment after groove-welding is not needed, the repairing operation may be easily performed and hence the workability may be improved.

In the nozzle repairing method of the embodiment, the in-core instrument tube 204 is removed from the lower mirror 66, and the surface of the groove-welding portion 206 is subjected to the buttered welding so as to form the surface buttered welding portion 210. Accordingly, the surface of the existing welding portion 211 is covered by the new surface buttered welding portion 210, and hence the stress corrosion resistance may be improved.

In the nozzle repairing method of the embodiment, when the buttered welding is performed on the surface of the groove-welding portion 206, the surface buttered welding portion 210 extends to the inner surface of the lower mirror 66 and the attachment hole 203. Accordingly, the surface of the existing welding portion 211 is covered by the new surface buttered welding portion 210 without any gap, and hence the stress corrosion resistance may be improved.

In the nozzle repairing method of the embodiment, the welding material (new groove-welding portion 213) used to fix the new in-core instrument tube 204A to the lower mirror 66 has stress corrosion resistance higher than that of the welding material of the groove-welding portion 206. Accordingly, the stress corrosion resistance may be improved compared to the instrumentation nozzle 83 of the related art.

In the nozzle repairing method of the embodiment, the flow of water is stopped at the upper and lower ends of the existing in-core instrument tube 204, and the water inside the nuclear reactor vessel 61 is drained so as to form the air space. Here, various operations are performed inside the air space. Accordingly, since the air space is formed in the entire area inside the nuclear reactor vessel 61, the workability may be improved.

Further, after the instrumentation nozzle 83 is repaired in the nuclear reactor vessel of the embodiment, the attachment hole 203 of the nuclear reactor vessel body 62 provided with the buttered welding layer 202 formed of stainless steel and provided on the inner surface of the base material 201 formed of low-alloy steel is provided with the existing groove-welding portion 206 which is formed at the inner surface side in a semi-spherical shape, the in-core instrument tube 204A formed of nickel base alloy is inserted into the groove-welding portion 206 and the attachment hole 203 so as to be positioned thereto, the welding groove 212 of the groove-welding portion 206 is provided with the new groove-welding portion 213 which is formed of nickel base alloy having stress corrosion resistance higher than that of the groove-welding portion 206, and the in-core instrument tube 204A is fixed by the new groove-welding portion 213.

Accordingly, the new in-core instrument tube 204A is fixed to the lower mirror 66 of the nuclear reactor vessel body 62 by the new groove-welding portion 213 having high stress corrosion resistance, and hence the stress corrosion resistance of the instrumentation nozzle 83 may be improved.

Furthermore, in the above-described embodiment, the method of repairing the instrumentation nozzle 83 provided in the lower mirror 66 of the nuclear reactor vessel body 62 has been described, but the invention may be applied to the method of repairing the instrumentation nozzle provided in the upper mirror of the nuclear reactor vessel cover 63. Further, the nozzle repairing method of the invention is applied to the pressurized water reactor, but may be also applied to the water boiling type nuclear reactor vessel.

REFERENCE SIGNS LIST

61 NUCLEAR REACTOR VESSEL
62 NUCLEAR REACTOR VESSEL BODY
63 NUCLEAR REACTOR VESSEL COVER
66 LOWER MIRROR (SEMI-SPHERICAL PORTION)
83 INSTRUMENTATION NOZZLE
84 IN-CORE INSTRUMENT GUIDE TUBE
85 CONDUIT TUBE
88 THIMBLE TUBE
201 BASE MATERIAL
202 BUTTERED WELDING LAYER
203 ATTACHMENT HOLE
204 IN-CORE INSTRUMENT TUBE
204A IN-CORE INSTRUMENT TUBE
205 GROOVE
206 GROOVE-WELDING PORTION
208 TREPANNED PORTION (FIRST CONNECTION PORTION)
210 SURFACE BUTTERED WELDING PORTION
211 EXISTING WELDING PORTION (SECOND CONNECTION PORTION AND FIRST GROOVE-WELDING PORTION)
212 WELDING GROOVE
213 NEW GROOVE-WELDING PORTION (SECOND GROOVE-WELDING PORTION)

The invention claimed is:

1. A nozzle repairing method of repairing an instrumentation nozzle in which an in-core instrument tube is inserted into an attachment hole formed in a semi-spherical portion of a nuclear reactor vessel having a buttered welding layer on its inner surface and an inner surface side of the semi-spherical portion includes a first connection portion and a second connection portion formed in a groove-welding portion so as to fix the in-core instrument tube, the nozzle repairing method comprising:
   removing the first connection portion with respect to the in-core instrument tube in the groove-welding portion;
   removing the in-core instrument tube from the semi-spherical portion;
   disposing a tab plate inside an upper end portion of the attachment hole after removing the in-core instrument tube;
   forming a surface buttered welding portion to cover surfaces of at least a portion of the tab plate, the second connection portion and at least a portion of the buttered welding layer after disposing the tab plate;
   grooving a part of the second connection portion with respect to the semi-spherical portion in the groove-welding portion while leaving a remaining of the second connection portion after forming the surface buttered welding portion;
   inserting a new in-core instrument tube into the attachment hole; and
   groove-welding the inner surface side of the semi-spherical portion so as to fix the new in-core instrument tube.

2. The nozzle repairing method according to claim 1, wherein the in-core instrument tube is removed from the semi-spherical portion, and buttered welding is performed on a surface of the groove-welding portion.

3. The nozzle repairing method according to claim 2, wherein when performing the buttered welding on the surface of the groove-welding portion, the buttered welding is performed so as to extend to the inner surface of the semi-spherical portion and the buttered welding is performed so as to extend to the attachment hole.

4. The nozzle repairing method according to claim 1, wherein the groove-welding includes using a material having stress corrosion resistance higher than that of a welding material of the groove-welding portion as a welding material used when fixing the new in-core instrument tube to the semi-spherical portion.

5. The nozzle repairing method according to claim 1, wherein an operation is performed in an air space as the periphery of at least the instrumentation nozzle.

6. The nozzle repairing method according to claim 5, wherein the flow of water is stopped at upper and lower ends of the existing in-core instrument tube, and the water inside the nuclear reactor vessel is drained so as to form the air space.

* * * * *